(12) United States Patent
Dojan et al.

(10) Patent No.: US 8,789,294 B2
(45) Date of Patent: Jul. 29, 2014

(54) CONTOURED FLUID-FILLED CHAMBER WITH TENSILE STRUCTURES

(75) Inventors: Frederick J. Dojan, Vancouver, WA (US); Danielle L. Taylor, Portland, OR (US); Kirvan L. Chao, Portland, OR (US); Klaas P. Hazenberg, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 738 days.

(21) Appl. No.: 13/049,268

(22) Filed: Mar. 16, 2011

(65) Prior Publication Data
US 2012/0233879 A1    Sep. 20, 2012

(51) Int. Cl.
A43B 13/12    (2006.01)
A43B 13/18    (2006.01)

(52) U.S. Cl.
CPC .............. *A43B 13/12* (2013.01); *A43B 13/18* (2013.01)
USPC .............................................. 36/44; 36/25 R

(58) Field of Classification Search
USPC ........................................ 36/43, 44, 25 R, 28
See application file for complete search history.

(56) References Cited

U.S. PATENT DOCUMENTS

| | | |
|---|---|---|
| 4,183,156 A | 1/1980 | Rudy |
| 4,219,945 A | 9/1980 | Rudy |
| 4,936,029 A | 6/1990 | Rudy |
| 5,042,176 A | 8/1991 | Rudy |
| 5,543,194 A | 8/1996 | Rudy |
| 5,625,964 A | 5/1997 | Lyden et al. |
| 5,713,141 A | 2/1998 | Mitchell et al. |
| 5,952,065 A | 9/1999 | Mitchell et al. |
| 6,013,340 A | 1/2000 | Bonk et al. |
| 6,082,025 A | 7/2000 | Bonk et al. |
| 6,127,026 A | 10/2000 | Bonk et al. |
| 6,203,868 B1 | 3/2001 | Bonk et al. |
| 6,321,465 B1 | 11/2001 | Bonk et al. |
| 6,385,864 B1 | 5/2002 | Seller, Jr. et al. |
| 7,131,218 B2 | 11/2006 | Schindler |
| 7,210,249 B2 | 5/2007 | Passke et |
| 7,409,779 B2 | 8/2008 | Dojan et al. |

(Continued)

FOREIGN PATENT DOCUMENTS

| | | |
|---|---|---|
| WO | WO9938403 | 8/1999 |
| WO | WO2012061313 | 5/2012 |

OTHER PUBLICATIONS

International Search Report and Written Opinion in PCT Application No. PCT/US2012/028108, mailed on Jul. 10, 2012.

(Continued)

*Primary Examiner* — Marie Bays
(74) *Attorney, Agent, or Firm* — Plumsea Law Group, LLC

(57) ABSTRACT

A fluid-filled chamber, which may be incorporated into articles of footwear and other products, may include an outer barrier, a first tensile structure, and a second tensile structure. Any of the first and second tensile structures may include one or more textile tensile members. The first and second tensile structures may be located within an interior void defined by the outer barrier and may be bonded to the outer barrier. The first and second tensile structures may be bonded to the outer barrier in different areas of the outer barrier that are in fluid communication with each other. The first tensile structure may have a height greater than a height of the second tensile structure. In turn, the relative locations and differences of height between the tensile structures may impart a contour to the chamber.

31 Claims, 31 Drawing Sheets

(56) References Cited

U.S. PATENT DOCUMENTS

| | | |
|---|---|---|
| 7,588,654 B2 | 9/2009 | Schindler et al. |
| 7,591,919 B2 | 9/2009 | Schindler et al. |
| 2005/0183287 A1 | 8/2005 | Schindler |
| 2007/0169376 A1 | 7/2007 | Hatfield et al. |
| 2008/0066342 A1* | 3/2008 | Park .................................. 36/29 |
| 2009/0288312 A1 | 11/2009 | Dua |
| 2009/0288313 A1 | 11/2009 | Rapaport et al. |
| 2011/0131831 A1 | 6/2011 | Peyton et al. |
| 2012/0211147 A1* | 8/2012 | Rapaport et al. .............. 156/145 |
| 2012/0216943 A1* | 8/2012 | Rapaport et al. .............. 156/145 |
| 2012/0233879 A1* | 9/2012 | Dojan et al. ....................... 36/29 |
| 2012/0233880 A1* | 9/2012 | Chao et al. ........................ 36/29 |

OTHER PUBLICATIONS

International Search Report and Written Opinion in PCT Application No. PCT/US2012/028101, mailed on Sep. 6, 2012.
International Search Report and Written Opinion in PCT Application No. PCT/US2012/027915, mailed on Aug. 27, 2012.
International Preliminary Report on Patentability for PCT/US2012/028101 mailed Sep. 26, 2013.

* cited by examiner

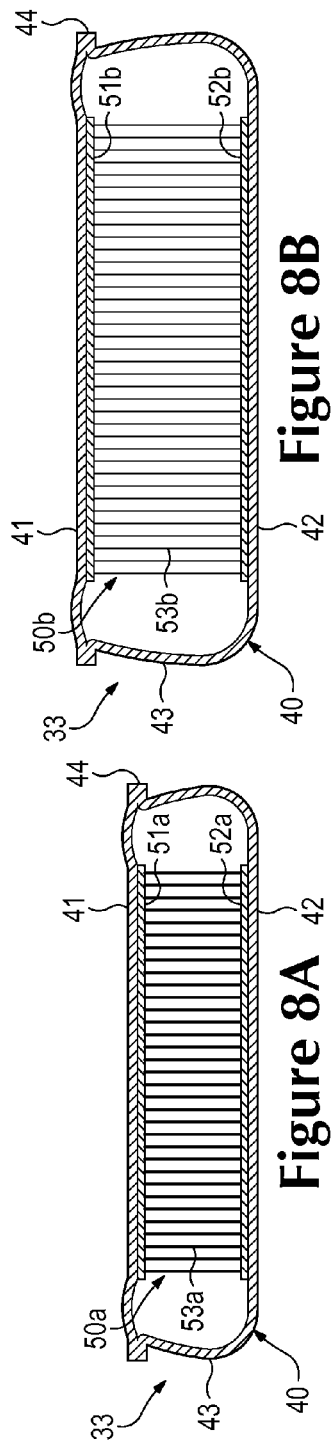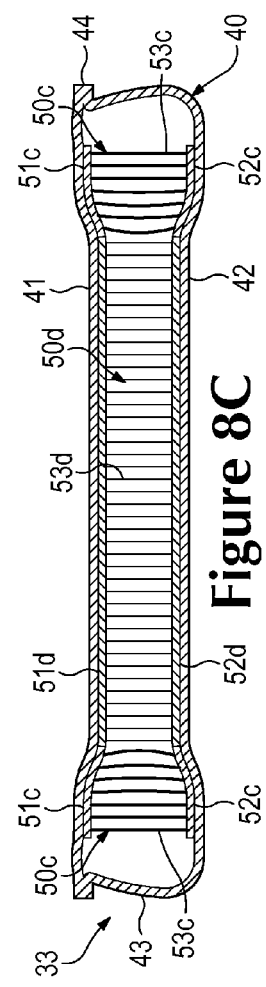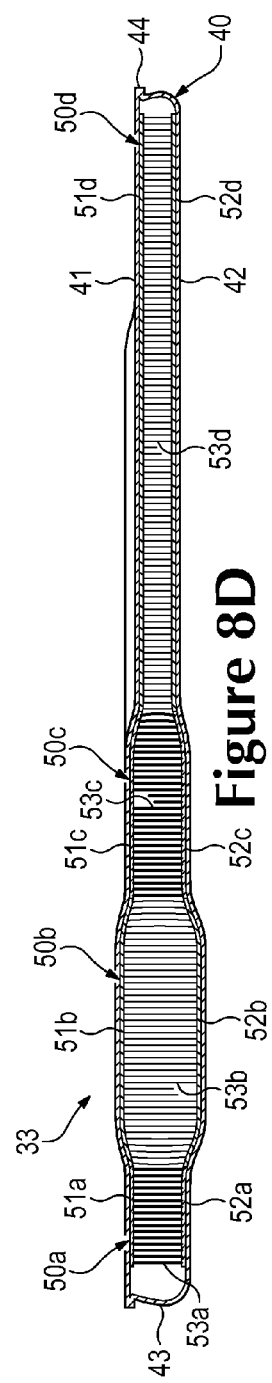

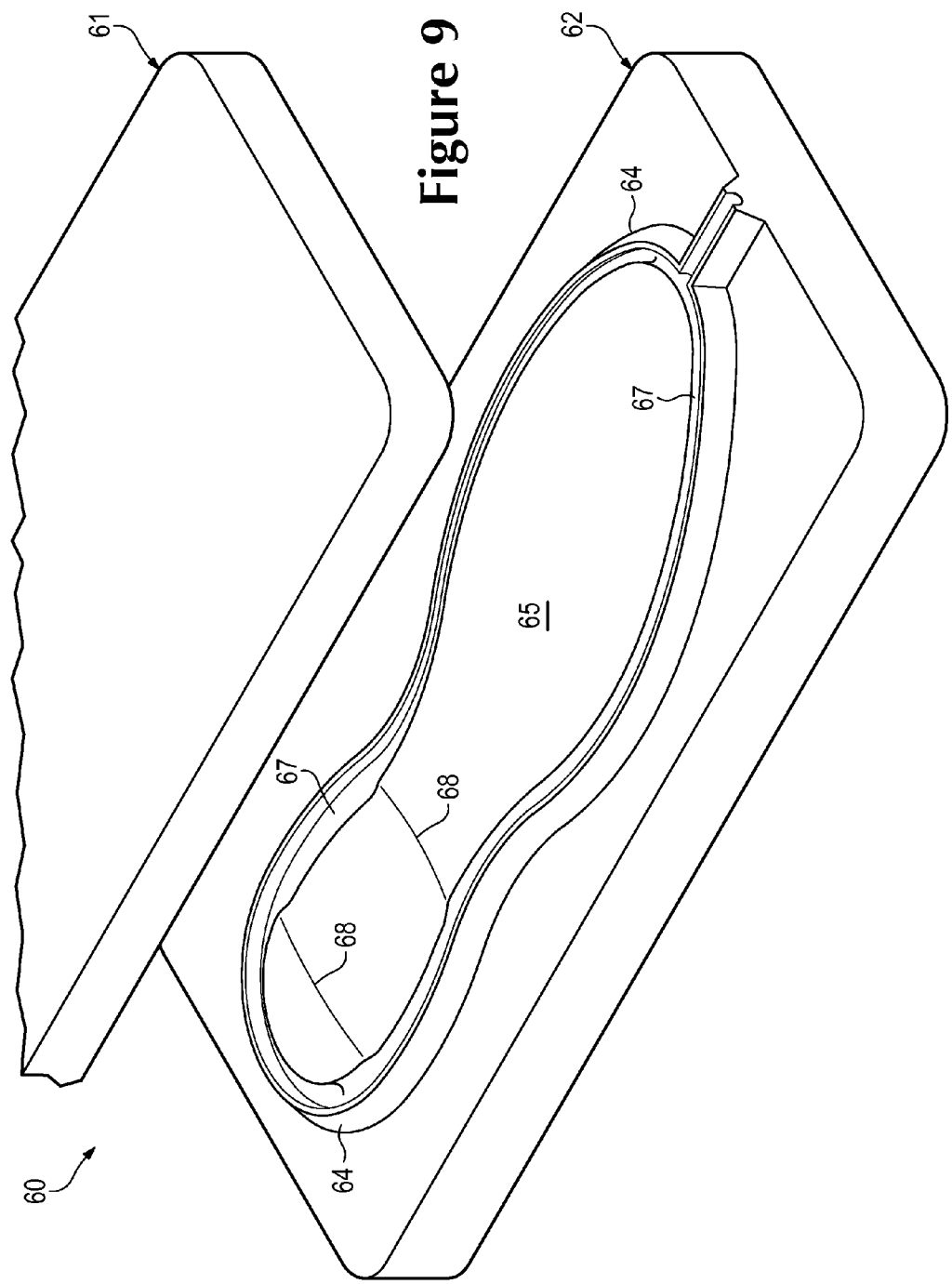

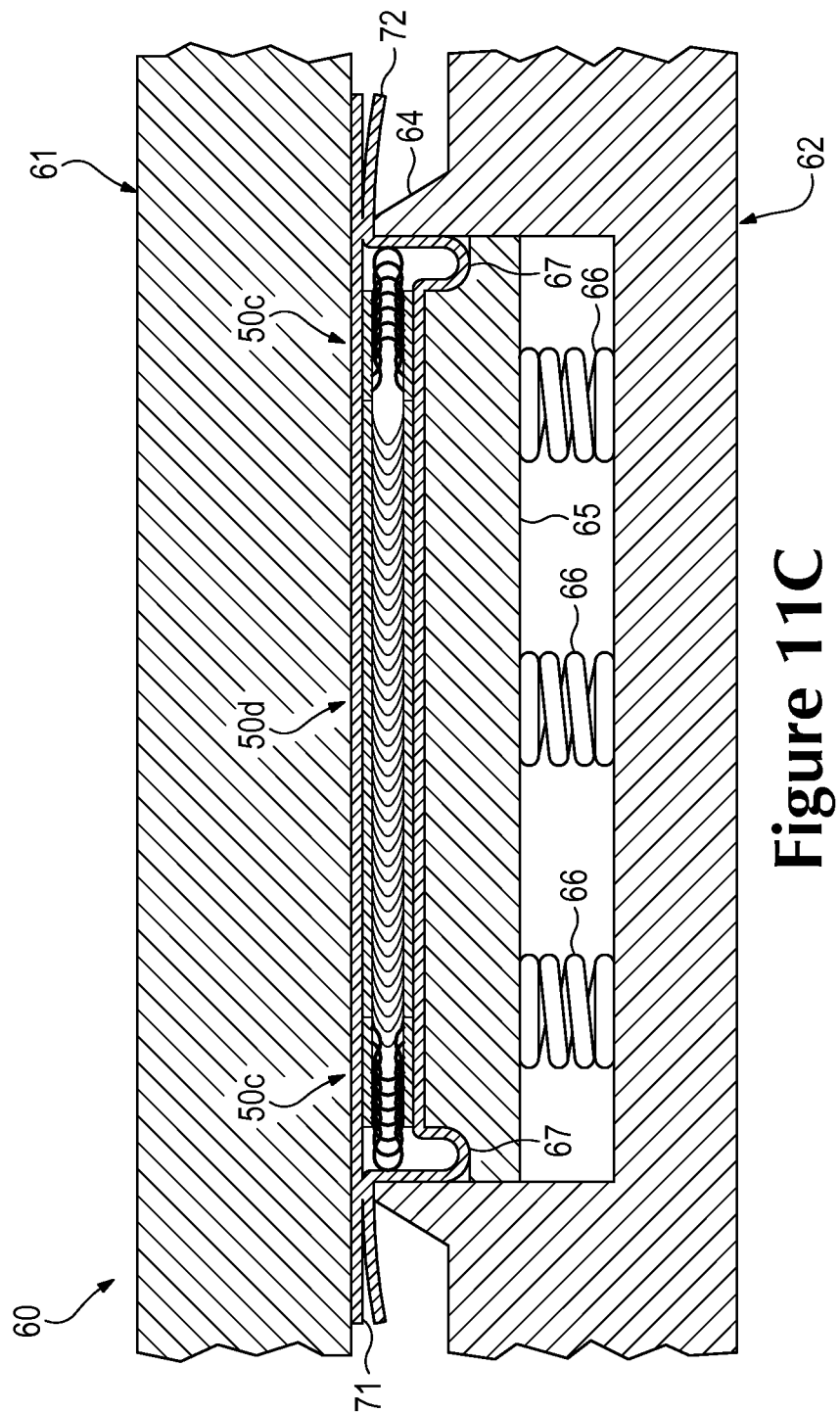

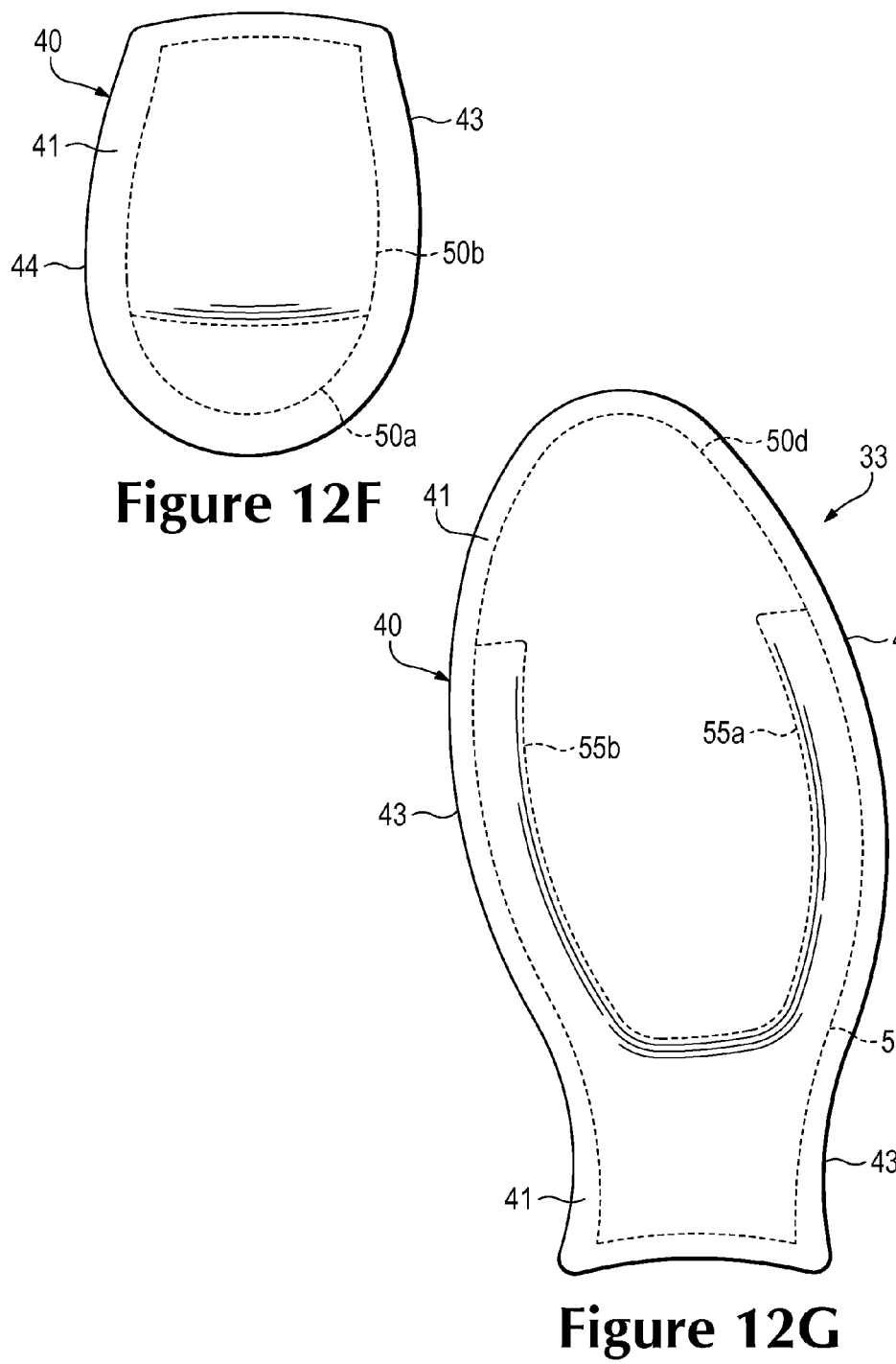

CONTOURED FLUID-FILLED CHAMBER WITH TENSILE STRUCTURES

BACKGROUND

Articles of footwear generally include two primary elements, an upper and a sole structure. The upper is formed from a variety of material elements (e.g., textiles, foam, leather, and synthetic leather) that are stitched or adhesively bonded together to form a void on the interior of the footwear for comfortably and securely receiving a foot. An ankle opening through the material elements provides access to the void, thereby facilitating entry and removal of the foot from the void. In addition, a lace is utilized to modify the dimensions of the void and secure the foot within the void.

The sole structure is located adjacent to a lower portion of the upper and is generally positioned between the foot and the ground. In many articles of footwear, including athletic footwear, the sole structure conventionally incorporates an insole, a midsole, and an outsole. The insole is a thin compressible member located within the void and adjacent to a lower surface of the void to enhance footwear comfort. The midsole, which may be secured to a lower surface of the upper and extends downward from the upper, forms a middle layer of the sole structure. In addition to attenuating ground reaction forces (i.e., providing cushioning for the foot), the midsole may limit foot motions or impart stability, for example. The outsole, which may be secured to a lower surface of the midsole, forms the ground-contacting portion of the footwear and is usually fashioned from a durable and wear-resistant material that includes texturing to improve traction.

The conventional midsole is primarily formed from a foamed polymer material, such as polyurethane or ethylvinylacetate, that extends throughout a length and width of the footwear. In some articles of footwear, the midsole may incorporate a variety of additional footwear elements that enhance the comfort or performance of the footwear, including plates, moderators, fluid-filled chambers, lasting elements, or motion control members. In some configurations, any of these additional footwear elements may be located between the midsole and the upper or between the midsole and the outsole, may be embedded within the midsole, or may be encapsulated by the foamed polymer material of the midsole, for example. Although many conventional midsoles are primarily formed from a foamed polymer material, fluid-filled chambers or other non-foam structures may form part of or a majority of some midsole configurations.

SUMMARY

Various features of a fluid-filled chamber, which may be incorporated into articles of footwear and other products, are disclosed below. In one configuration, a fluid-filled chamber comprises an outer barrier, a first tensile structure, and a second tensile structure. The outer barrier defines an interior void and has a first area and a second area, the first area and second area being in fluid communication. The first tensile structure is located within the interior void, is bonded to the outer barrier in the first area, and has a first height. The second tensile structure is located within the interior void, is bonded to the outer barrier in the second area, and has a second height. The first height is greater than the second height.

In another configuration, an article of footwear incorporates a sole structure, the sole structure comprising a midsole and an outsole. The midsole includes a fluid-filled chamber. The fluid-filled chamber comprises an outer barrier, a first tensile structure, and a second tensile structure. The outer barrier has an upper portion, an opposite lower portion, and a peripheral edge. The first tensile structure is located within the outer barrier. The second tensile structure is located within the outer barrier. The outsole is secured to the midsole and forms at least part of a ground-contacting surface of the footwear. The first tensile structure has a first height at a first part near the second tensile structure, and the second tensile structure has a second height greater than the first height at a second part near the first tensile structure. An area of the chamber located between the first part and the second part is substantially free of interior bonds.

In a further configuration, an article of footwear incorporates a sole structure, the sole structure comprising a midsole and an outsole. The midsole includes a fluid-filled chamber. The fluid-filled chamber comprises an outer barrier, a first tensile structure, and a second tensile structure. The first tensile structure is located within the outer barrier in a first area of the chamber and has a first height. The second tensile structure is located within the outer barrier in a second area of the chamber, the second area being in fluid communication with the first area, and has a second height greater than the first height. The outsole is secured to the midsole and forms at least part of a ground-contacting surface of the footwear. The second tensile structure is located in at least a heel region of the footwear, and the first tensile structure is located rearward of the second tensile structure.

In another further configuration, an article of footwear incorporates a sole structure, the sole structure comprising a midsole and an outsole. The midsole includes a fluid-filled chamber. The fluid-filled chamber comprises an outer barrier, a first tensile structure, and a second tensile structure. The outer barrier has an upper portion, an opposite lower portion, and a peripheral edge. The first tensile structure is located within the outer barrier in a first area of the chamber and has a first height. The second tensile structure is located within the outer barrier in a second area of the chamber, the second area being in fluid communication with the first area, and has a second height less than the first height. The outsole is secured to the midsole and forms at least part of a ground-contacting surface of the footwear. The first tensile structure is located in at least a midfoot region of the footwear, and the second tensile structure is located forward of the first tensile structure.

In still another further configuration, an article of footwear incorporates a sole structure, the sole structure comprising a midsole and an outsole. The midsole includes a fluid-filled chamber. The fluid-filled chamber comprises an outer barrier, a first tensile structure, a second tensile structure, and a third tensile structure. The outer barrier has an upper portion, an opposite lower portion, and a peripheral edge. The first tensile structure is located within the outer barrier in a first area of the chamber. The second tensile structure is located within the outer barrier in a second area of the chamber. The third tensile structure is located within the outer barrier in a third area of the chamber. The outsole is secured to the midsole and forms at least part of a ground-contacting surface of the footwear. The first area is in a rear-most region of the chamber and has a first height. The second area of the chamber is between the rear-most region of the chamber and a fore-most region of the chamber and has a second height greater than the first height. The third area of the chamber is in a fore-most region of the chamber and has a third height less than the second height.

The advantages and features of novelty characterizing aspects of the invention are pointed out with particularity in the appended claims. To gain an improved understanding of the advantages and features of novelty, however, reference may be made to the following descriptive matter and accom-

FIGURE DESCRIPTIONS

The foregoing Summary and the following Detailed Description will be better understood when read in conjunction with the accompanying figures.

FIGS. 8A-8D are cross-sectional views of the chamber, as defined by section lines 8A-8A through 8D-8D in FIG. 6.

FIG. 9 is a perspective view of a mold that may be utilized for a process for manufacturing the chamber.

FIGS. 11A-11E are schematic cross-sectional views of the mold, as defined by section lines 11A-11A through 11E-11E in FIGS. 10A-10E, depicting steps in the process for manufacturing the chamber.

FIGS. 12A-12H are top plan views corresponding with FIG. 6 and depicting additional configurations of the chamber.

DETAILED DESCRIPTION

The following discussion and accompanying figures disclose various configurations of fluid-filled chambers and methods for manufacturing the chambers. Although the chambers are disclosed with reference to footwear having a configuration that is suitable for running, concepts associated with the chambers may be applied to a wide range of athletic footwear styles, including basketball shoes, cross-training shoes, football shoes, golf shoes, hiking shoes and boots, ski and snowboarding boots, soccer shoes, tennis shoes, and walking shoes, for example. Concepts associated with the chambers may also be utilized with footwear styles that are generally considered to be non-athletic, including dress shoes, loafers, and sandals. In addition to footwear, the chambers may be incorporated into other types of apparel and athletic equipment, including helmets, gloves, and protective padding for sports such as football and hockey. Similar chambers may also be incorporated into cushions and other compressible structures utilized in household goods and industrial products. Accordingly, chambers incorporating the concepts disclosed herein may be utilized with a variety of products.

General Footwear Structure

Figure 1:
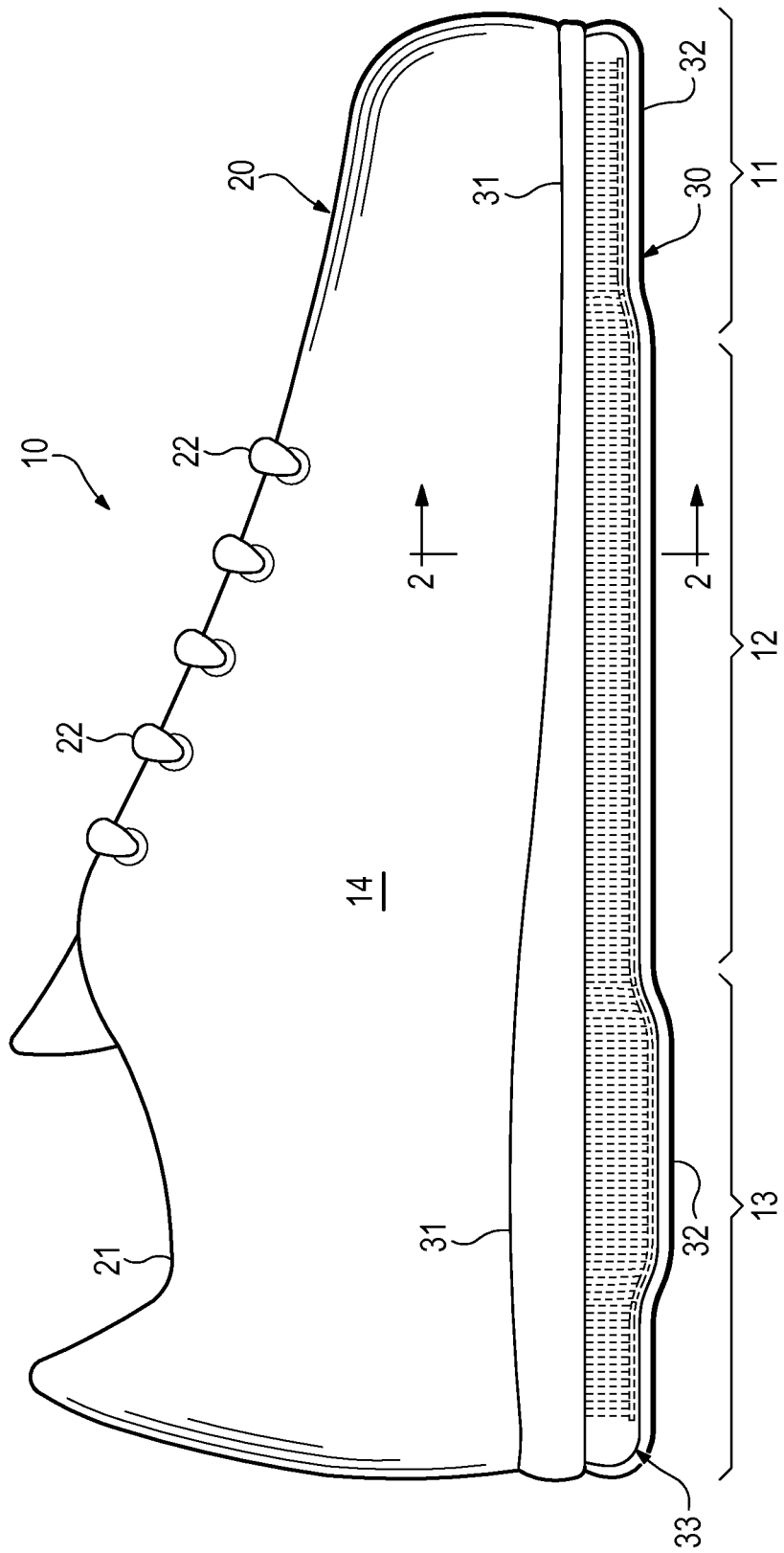
FIG. 1 is a lateral side elevational view of an article of footwear incorporating a fluid-filled chamber.
Figure 2:
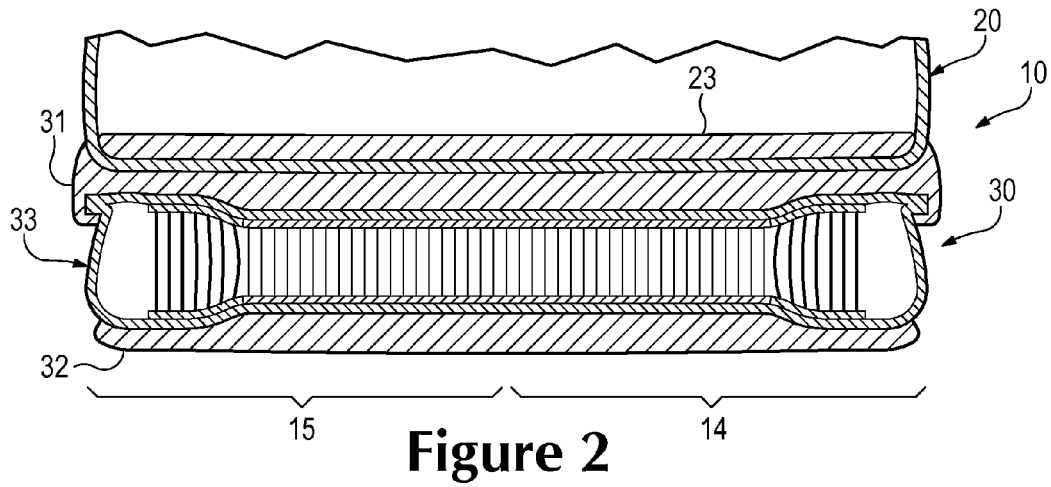
FIG. 2 is a cross-sectional view of the article of footwear, as defined by section line 2-2 in FIG. 1.
Figure 3A:
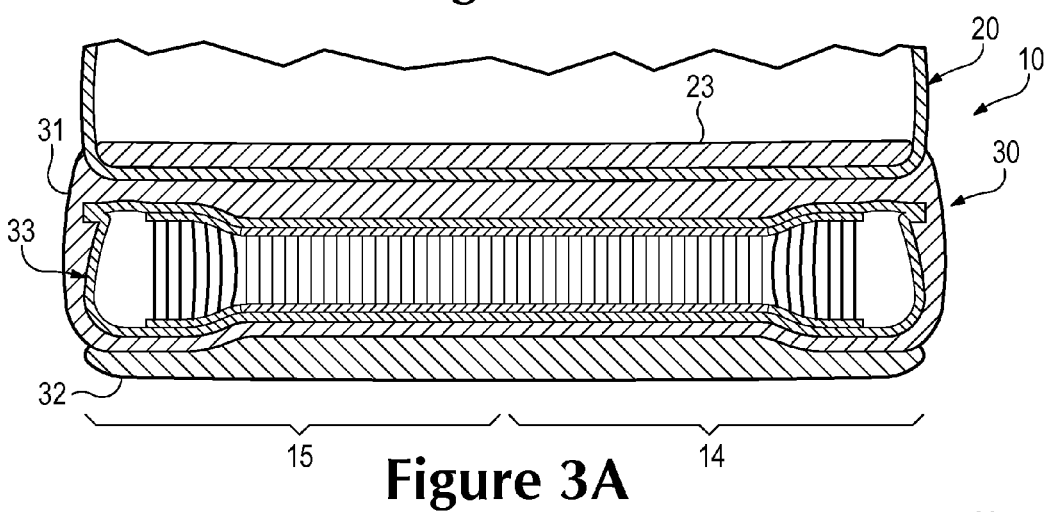
FIGS. 3A-3B are cross-sectional views corresponding with FIG. 2 and depicting additional configurations of the article of footwear.
Figure 3B:
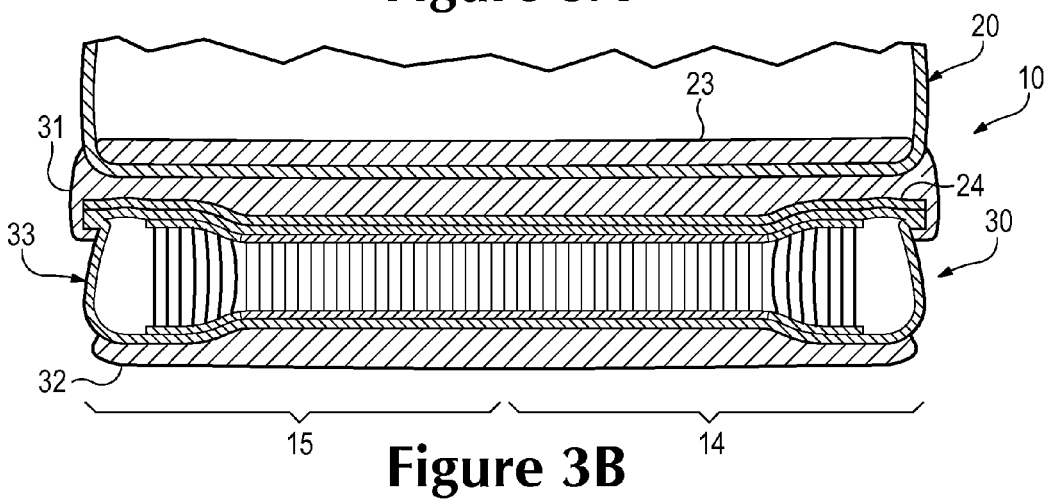
Figure 4:
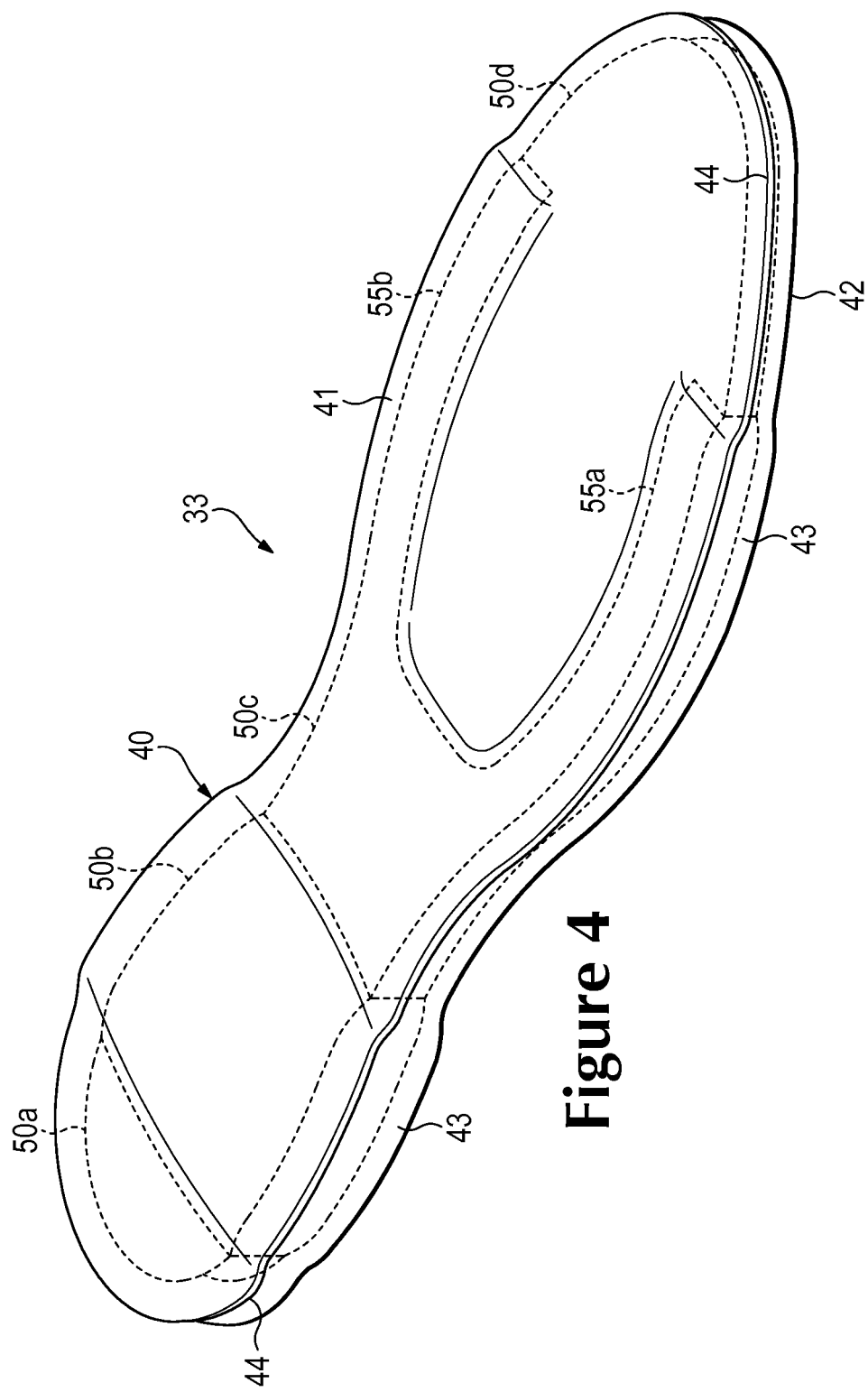
FIG. 4 is a perspective view of the chamber.
Figure 5:
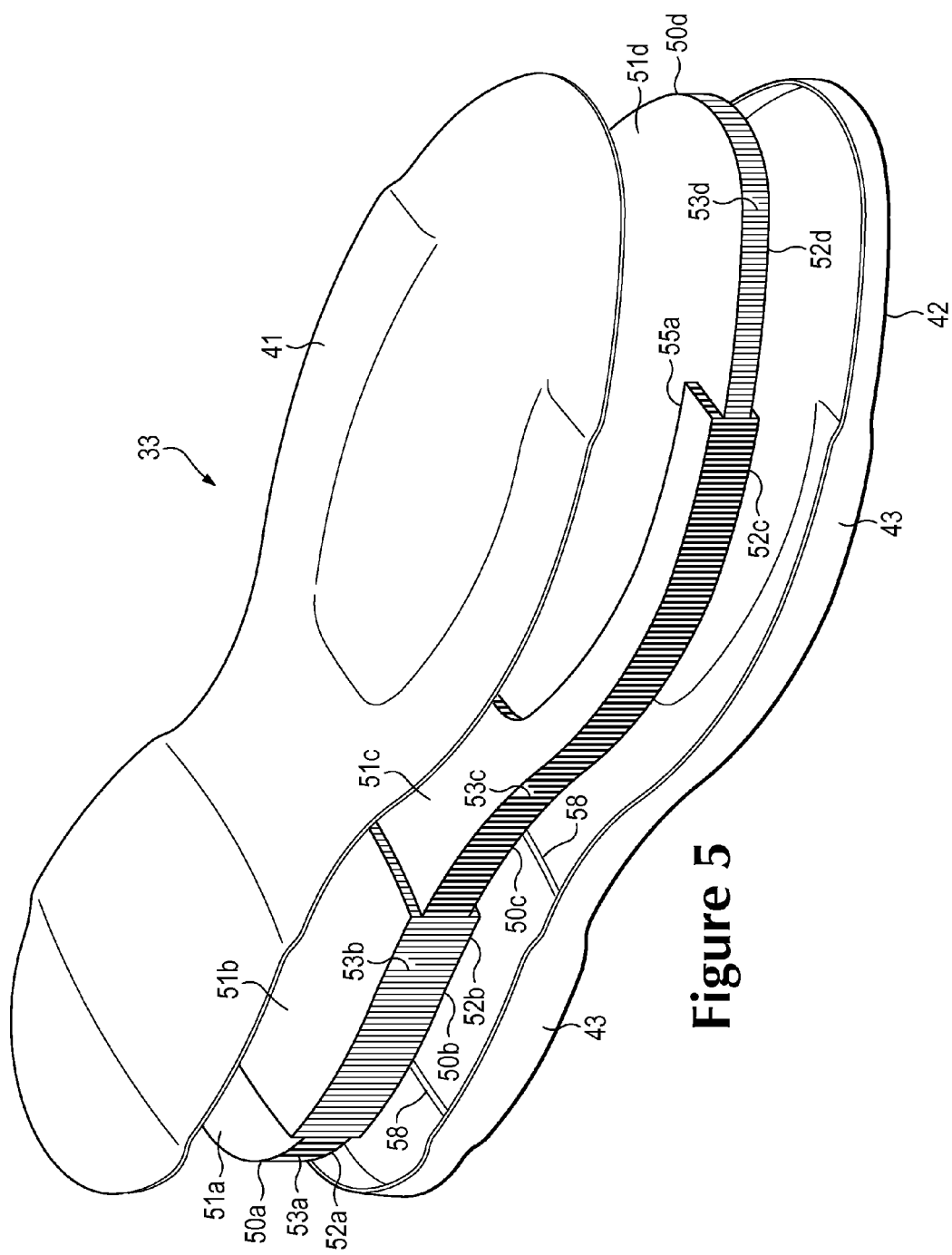
FIG. 5 is an exploded perspective view of the chamber.
Figure 6:
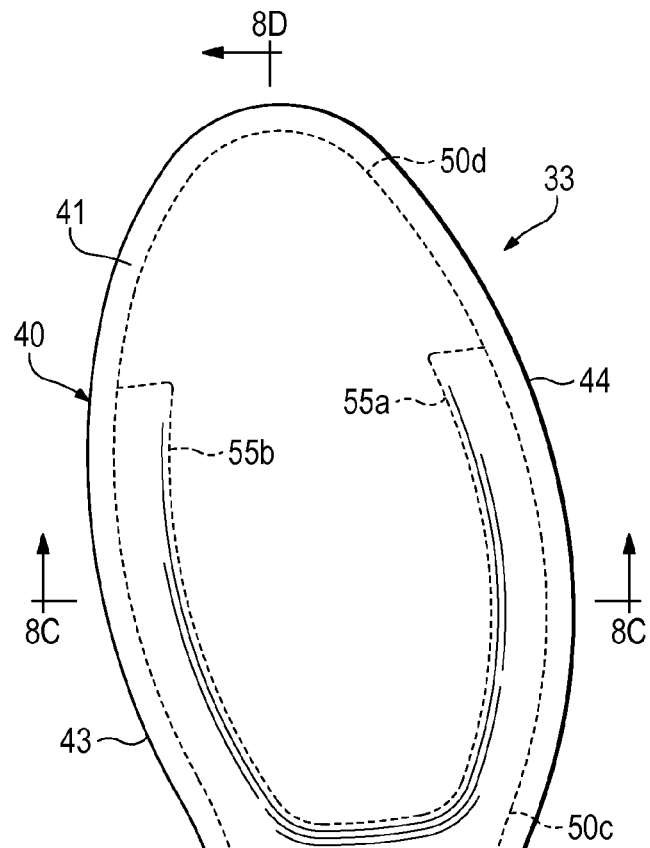
FIG. 6 is a top plan view of the chamber.
Figure 7:
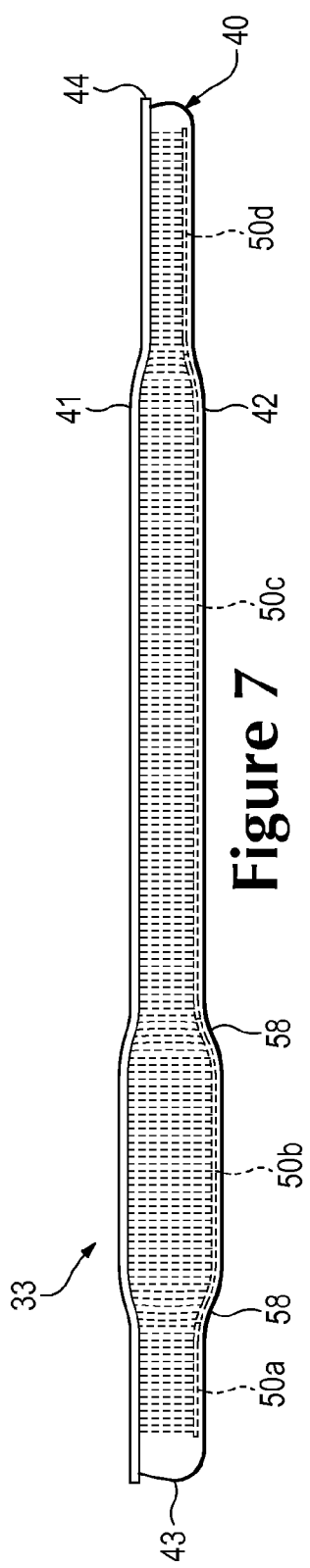
FIG. 7 is a lateral side elevational view of the chamber.

An article of footwear 10 is depicted in FIGS. 1-3B as including an upper 20 and a sole structure 30. For reference purposes, footwear 10 may be divided into three general regions: a forefoot region 11, a midfoot region 12, and a heel region 13, as shown in FIG. 1. Forefoot region 11 generally includes portions of footwear 10 corresponding with the toes and the joints connecting the metatarsals with the phalanges. Midfoot region 12 generally includes portions of footwear 10 corresponding with the arch area of the foot. Heel region 13 generally includes portions of footwear 10 corresponding with rear portions of the foot, including the calcaneus bone. Regions 11-13 are not intended to demarcate precise areas of footwear 10. Rather, regions 11-13 are intended to represent general areas of footwear 10 to aid in the following discussion. In addition to being applied to footwear 10, regions 11-13 may also be applied to upper 20, sole structure 30, and individual elements thereof. Footwear 10 also includes a lateral side 14 and a medial side 15, as shown in FIGS. 2-3B. Lateral side 14 and medial side 15 also extend through each of regions 11-13 and correspond with opposite sides of footwear 10. As with regions 11-13, sides 14 and 15 represent general areas of footwear 10 to aid in the following discussion, and may also be applied to upper 20, sole structure 30, and individual elements thereof in addition to being applied to footwear 10.

Upper 20 is depicted as having a substantially conventional configuration incorporating a plurality of material elements (e.g., textile, foam, leather, and synthetic leather) that are stitched, adhered, bonded, or otherwise joined together to form an interior void for securely and comfortably receiving a foot. The material elements may be selected and located with respect to upper 20 in order to selectively impart properties of durability, air-permeability, wear-resistance, flexibility, and comfort, for example. An ankle opening 21 in heel region 13 provides access to the interior void. In addition, upper 20 may include a lace 22 that is utilized in a conventional manner to modify the dimensions of the interior void, thereby securing the foot within the interior void and facilitating entry and removal of the foot from the interior void. Lace 22 may extend through apertures in upper 20, and a tongue portion of upper 20 may extend between the interior void and lace 22. Upper 20 may also incorporate a sockliner 23 that is located within the void in upper 20 and adjacent a plantar (i.e., lower) surface of the foot to enhance the comfort of footwear 10. Given that various aspects of the present application primarily relate to sole structure 30, upper 20 may exhibit the general configuration discussed above or the general configuration of practically any other conventional or non-conventional upper. Accordingly, the overall structure of upper 20 may vary significantly.

Sole structure 30 is secured to upper 20 and has a configuration that extends between upper 20 and the ground. In effect, therefore, sole structure 30 is located to extend between the foot and the ground. In addition to attenuating ground reaction forces (i.e., providing cushioning for the foot), sole structure 30 may provide traction, impart stability, and limit various foot motions, such as pronation. The primary elements of sole structure 30 are a midsole 31 and an outsole 32. Midsole 31 may incorporate a polymer foam material, such as polyurethane or ethylvinylacetate. Midsole 31 may also incorporate a fluid-filled chamber 33. In addition to the polymer foam material and chamber 33, midsole 31 may incorporate one or more other footwear elements that enhance the comfort, performance, or ground reaction force attenuation properties of footwear 10, including plates, moderators, lasting elements, or motion control members.

Outsole 32, which may be absent in some configurations of footwear 10, is secured to a lower surface of midsole 31 and forms at least part of a ground-contacting surface of footwear 10. Outsole 32 may be formed from a rubber material that provides a durable and wear-resistant surface for engaging the ground. In addition, outsole 32 may also be textured to enhance the traction (i.e., friction) properties between footwear 10 and the ground. In further configurations, and depending upon the manner in which midsole 31 incorporates the polymer foam material, chamber 33, or both, outsole 32 may be secured to the polymer foam material alone, to chamber 33 alone, or to both the polymer foam material and chamber 33.

As incorporated into footwear 10, chamber 33 has a shape that extends through substantially all of footwear 10, from forefoot region 11 to heel region 13 and also from lateral side 14 to medial side 15, thereby having a shape that corresponds with an outline of the foot and extends under substantially all of the foot. Accordingly, when the foot is located within upper 20, chamber 33 extends under the foot in order to attenuate ground reaction forces that are generated when sole structure 30 is compressed between the foot and the ground during various ambulatory activities, such as running and walking. In other configurations, chamber 33 may extend through less than all of footwear 10. For example, chamber 33 may extend only through forefoot region 11, or only through midfoot region 12, or only through heel region 13. Alternatively, chamber 33 may extend only through lateral side 14 of footwear 10, or only through medial side 15 of footwear 10. Chamber 33 may also extend through any combination of regions and sides. That is, in various configurations, chamber 33 may extend through any portion of footwear 10.

As depicted in FIGS. 1-3B, chamber 33 is positioned below a polymer foam material of midsole 31 and is secured to the polymer foam material as well as to outsole 32. In some configurations, however, chamber 33 may be above a polymer foam material of midsole 31, between layers of a polymer foam material of midsole 31, at least partially encapsulated by a polymer foam material of midsole 31, or even substantially surrounded by or entirely encapsulated within a polymer foam material of midsole 31, as depicted in FIG. 3A. In other configurations, chamber 33 may be secured to a plate 23 or other structure within midsole 31. In further configurations, the polymer foam material of midsole 31 may be absent and chamber 33 may be secured to both upper 20 and outsole 32. Accordingly, the overall shape of chamber 33 and the manner in which chamber 33 is incorporated into footwear 10 may vary significantly.

Although chamber 33 is depicted and discussed as being a sealed chamber within footwear 10, chamber 33 may also be a component of a fluid system within footwear 10. More particularly, pumps, conduits, and valves may be joined with chamber 33 to provide a fluid system that pressurizes chamber 33 with air from the exterior of footwear 10 or a reservoir within footwear 10. As examples, chamber 33 may be utilized in combination with any of the fluid systems disclosed in U.S. Pat. No. 7,210,249 to Passke, et al. and U.S. Pat. No. 7,409,779 to Dojan, et al.

Chamber Configuration

Chamber 33 is depicted individually in FIGS. 4-8D in an initial configuration that is suitable for footwear applications. Chamber 33 has a contoured configuration, and when incorporated into footwear 10, chamber 33 corresponds with substantially all of footwear 10. When the foot is located within upper 20, chamber 33 extends under the foot in order to attenuate ground reaction forces that are generated when sole structure 30 is compressed between the foot and the ground during various ambulatory activities, such as running and walking. In other configurations, chamber 33 may have an alternate extent, such as extending under a forefoot area of the foot, or a heel area of the foot, for example. Additionally, although chamber 33 is depicted as being exposed on both lateral side 14 and medial side 15 of footwear 10, in some configurations of footwear 10, a polymer foam material of midsole 31 may form at least part of a sidewall of midsole 31.

The primary elements of chamber 33 are an outer barrier 40 and tensile structures 50a-50d. Barrier 40 (a) forms an exterior of chamber 33, (b) defines an interior void that receives both a pressurized fluid and tensile structures 50a-50d, and (c) provides a durable sealed barrier for retaining the pressurized fluid within chamber 33. The polymer material of barrier 40 includes (a) a first barrier portion 41 oriented toward upper 20 that may form an upper portion of barrier 40, (b) an opposite second barrier portion 42 oriented toward outsole 32 that may form a lower portion of barrier 40, and (c) a peripheral edge 43 that extends around a periphery of chamber 33 and between barrier portions 41 and 42.

As depicted in FIGS. 4-8D, tensile structures 50a-50d are located within the interior void and may be tensile members such as textile tensile members. In other configurations, tensile structures may include elements that are not textile tensile members, such as any of the tether elements disclosed in U.S. patent application Ser. No. 12/630,642 to Peyton and U.S. patent application Ser. No. 12/777,167 to Peyton. In some configurations, tensile member 50 may be formed from, or be formed to include a foam tensile member such as any of the foam tensile members disclosed in U.S. Pat. No. 7,131,218 to Schindler, U.S. Pat. No. 7,588,654 to Schindler et al., and U.S. Pat. No. 7,591,919 to Schindler et al.

Tensile structures 50a-50d may include upper tensile layers 51a-51d, opposite lower tensile layers 52a-52d, and pluralities of connecting members 53a-53d, respectively, that extend between tensile layers 51a-51d and 52a-52d. Upper tensile layers 51a-51d are secured to inner surfaces of first barrier portion 41 and lower tensile layers 52a-52d are secured to inner surfaces of second barrier portion 42. Connecting members 53a-53d may include yarns, fibers, or filaments formed of a variety of materials, and may be positioned across lengths and widths of tensile structures 52a-52d at relatively sparse densities, relatively packed densities, or any other densities. Although discussed in greater detail below, either adhesive bonding or thermobonding may be utilized to secure tensile structures 50a-50d to barrier 40. Tensile structures 50a-50d may be located in different areas of chamber 33 and may have different heights.

A wide range of polymer materials may be utilized for barrier 40. In selecting materials for barrier 40, engineering properties of the materials (e.g., tensile strength, stretch properties, fatigue characteristics, dynamic modulus, and loss tangent) as well as the ability of the materials to prevent the diffusion of the fluid contained by barrier 40 may be considered. When formed of thermoplastic urethane, for example, barrier 40 may have a thickness of approximately 1.0 millimeter, but the thickness may range from less than 0.25 to more than 2.0 millimeters, for example. In addition to thermoplastic urethane, examples of polymer materials that may be suitable for barrier 40 include polyurethane, polyester, polyester polyurethane, and polyether polyurethane. Barrier 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for barrier 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk, et al.

A variety of processes may be utilized to manufacture chamber 33. In general, the manufacturing processes involve (a) securing a pair of polymer sheets, which form barrier portions 41 and 42 as well as peripheral edge 43, to opposite sides of tensile structures 50a-50d (i.e., to tensile layers 51a-51d and 52a-52d) and (b) forming a peripheral bond 44 that joins a periphery of the polymer sheets and may extend around peripheral edge 43. Peripheral bond 44 is depicted as being adjacent to the upper surface of chamber 33, but may be positioned between the upper and lower surfaces of chamber 33, or may be adjacent to the lower surface of chamber 33. The thermoforming process may also (a) locate tensile structures 50a-50d within chamber 33, and (b) bond tensile structures 50a-50d to each of barrier portions 41 and 42. Although substantially all of the thermoforming process may be performed with a mold, as described in greater detail below, each of the various parts or steps of the process may be performed separately in forming chamber 33. That is, a variety of other methods may be utilized to form chamber 33.

In order to facilitate bonding between tensile structures 50a-50d and barrier 40, polymer supplemental layers may be applied to any of tensile layers 51a-51d and 52a-52d. When heated, the supplemental layers soften, melt, or otherwise begin to change state so that contact with barrier portions 41 and 42 induces material from each of barrier 40 and the supplemental layers to intermingle or otherwise join with each other. Upon cooling, therefore, the supplemental layers are permanently joined with barrier 40, thereby joining tensile structures 50a-50d with barrier 40. In some configurations, thermoplastic threads or strips may be present within tensile layers 51a-51d and 52a-52d to facilitate bonding with barrier 40, as disclosed in U.S. Pat. No. 7,070,845 to Thomas, et al., or an adhesive may be utilized to secure barrier 40 to any of tensile structures 50a-50d.

Following the thermoforming process, or as part of the thermoforming process, a fluid may be injected into the interior void and pressurized between zero and three-hundred-fifty kilopascals (i.e., approximately fifty-one pounds per square inch) or more. The pressurized fluid exerts an outward force upon barrier 40, which tends to separate barrier portions 41 and 42. Tensile structures 50a-50d, however, are secured to each of barrier portions 41 and 42 in order to impose an intended shape upon chamber 33 when pressurized. More particularly, connecting members 53a-53d extending across the interior void are placed in tension by the outward force of the pressurized fluid upon barrier 40, thereby preventing barrier 40 from expanding outward and causing chamber 33 to retain an intended shape. Whereas peripheral bond 44 joins the polymer sheets to form a seal that prevents the fluid from escaping, tensile structures 50a-50d prevent barrier 40 from expanding outward or otherwise distending due to the pressure of the fluid. That is, tensile structures 50a-50d effectively limit the expansion of chamber 33 to retain an intended shape of barrier portions 41 and 42.

The lengths of connecting members within each plurality of connecting members 53a-53d are substantially constant throughout tensile structures 50a-50d, which imparts the parallel configuration to each of tensile layers 51a-51d and 52a-52d. In some configurations, however, the lengths of connecting members within at least one plurality of connecting members 53a-53d may vary to impart a contoured configuration to chamber 33. For example, chamber 33 may taper or may form a depression due to differences in the lengths of connecting members within each plurality of connecting members 53a-53d. Examples of contoured tensile structures are disclosed in U.S. patent application Ser. No. 12/123,612 to Dua and Ser. No. 12/123,646 to Rapaport, et al. Additionally, tensile structures 50a-50d may include tensile members such as textile tensile members. That is, part of at least one of tensile structures 50a-50d may be formed of a textile tensile member. Textile tensile members may be cut or formed from a larger element of a spacer textile. Alternately, each of tensile elements 51a-51d and 52a-52d may be formed to have a variety of configurations through, for example, a flat-knitting process, as in U.S. patent application Ser. No. 12/123,612 to Dua.

Suitably configured, tensile structures 50a-50d may have any of a range of configurations, including the range of configurations disclosed in U.S. patent application Ser. No. 12/123,612 to Dua, U.S. patent application Ser. No. 12/123,646 to Rapaport, et al., and U.S. patent application Ser. No. 12/630,642 to Peyton. In some configurations, chamber 33 may incorporate a valve or other structure that permits the individual to adjust the pressure of the fluid. Additionally, chamber 33 may be incorporated into a fluid system, similar to a fluid system disclosed in U.S. Pat. No. 7,409,779 to Dojan, et al., that varies the pressure within barrier 40 depending upon, for example, the running style or weight of the wearer.

As depicted in FIGS. 4-8D, chamber 33, as well as tensile structures 50a-50d within chamber 33, extend substantially throughout footwear 10. Tensile structures 50a-50d are located in different areas of chamber 33, or in different areas of barrier 40 that forms an exterior of chamber 33 and defines an interior void within chamber 33. Tensile structure 50a is located in a first area of chamber 33, or in a first area of barrier 40 and within the interior void. Tensile structure 50b is located in a second area of chamber 33, or in a second area of barrier 40 and within the interior void. Tensile structure 50b is substantially in heel region 13 of footwear 10, and tensile structure 50a is rearward of tensile structure 50b. Tensile structure 50c is located in a third area of chamber 33, or in a third area of barrier 40 and within the interior void. Tensile structure 50c is at least partially located in midfoot region 12 of footwear 10. Tensile structure 50c includes a lateral segment 55a and a medial segment 55b of similar extent. Finally, tensile structure 50d is located in a fourth area of chamber 33, or in a fourth area of barrier 40 and within the interior void. Tensile structure 50d is located forward of tensile structure 50c and at least partially located between lateral segment 55a and medial segment 55b. The first area, second area, third area, and fourth area are in fluid communication with each other.

Additionally, each of tensile structures 50a-50d may have a different height than the other tensile structures 50a-50d. Tensile structure 50a has a height less than tensile structure 50b. Tensile structure 50b has a height greater than tensile structure 50c. Finally, tensile structure 50c has a height greater than tensile structure 50d. In turn, the relative locations and differences of height of tensile structure 50a-50d impart a contoured configuration to footwear 10. As depicted in FIGS. 4-8D, the relative locations and differences of height of tensile structures 50a-50d impart contours including a heel bevel and a forefoot pocket.

As depicted in FIGS. 4-8D, tensile structures 50a-50d are adjacent to each other. That is, tensile structures 50a-50d are positioned next to each other such that at least part of each tensile structure 50a-50d either directly contacts or is minimally spaced from one or more of the other tensile structures 50a-50d. However, where one tensile 50a-50d structure has a height greater than another nearby tensile structure 50a-50d, a portion of the chamber 33 in the area of the tensile structure with the greater height may have a shape imposed by the nearby tensile structure with the lesser height rather than a shape imposed by the tensile structure with the greater height. Accordingly, in some configurations, tensile structures may be spaced apart, and a portion of chamber 33 in the area in which the tensile structures are spaced apart may still have a shape imposed by the nearby tensile structure with the lesser height.

In some configurations, one or more portions of the outer barrier may be formed to include a molded height gradient. A molded height gradient located between two areas incorporating tensile structures of different heights may concentrate an imparted height difference between the two areas of the inflated chamber on one barrier portion of the chamber. In various configurations, barrier portion 41 or 42 may be molded or otherwise formed to include a molded height gradient 58 at least partially proximal to at least two tensile structures, such as at a location between tensile structures. For example, as depicted in FIGS. 4-8D, second barrier portion 42 is formed to include molded height gradient 58 located proximal to and between tensile structures 50b and 50c. In turn, a difference in height between the area of chamber 33 incorporating tensile structure 50b and the area of chamber 33 incorporating tensile structure 50c may be greater on second barrier portion 42 than on first barrier portion 41. As a result, molded height gradient 58 may concentrate a change in extension outward from chamber 33 at a lower surface of chamber 33 between the different areas of chamber 33 incorporating tensile structures 50b and 50c.

Although depicted in FIGS. 4-8D as including four tensile structures 50a-50d, various configurations of chambers 33 may include fewer tensile structures. In some configurations, chamber 33 may incorporate at least a first tensile structure and a second tensile structure. The tensile structures of chamber 33 may be located in different areas of chamber 33, or in different areas of barrier 40 and within the interior void, and may have different heights. For example, chamber 33 may incorporate a first tensile structure located in a first area and having a first height, and may incorporate a second tensile structure located in a second area and having a second height, the first height being greater than the second height. In some configurations, the first tensile structure and the second tensile structure may each be part of a single tensile structure that is contoured, tapered, or otherwise formed to have more than one height, where the first tensile structure is at least partially separated from the second tensile structure by at least one interior bond. That is, some part of the first tensile structure and some part of the second tensile structure may be at least partially separated by at least one interior bond.

Alternatively, the first tensile structure may have a first height at a first part near the second tensile structure, and the second tensile structure may have a second height at a second part near the first tensile structure, the second height being greater than the first height. That is, while both the first and second tensile structures may have a substantially flat configuration, either or both of the first tensile structure and the second tensile structure may be contoured, or may otherwise have more than one height, and a height of the second tensile structure at least at one point near the first tensile structure may be greater than a height of the first tensile structure at least at one point near the second tensile structure.

Chamber 33 may also be substantially free of internal bonds, i.e., bonds spaced inward from a peripheral edge of chamber 33. Accordingly, the first area of chamber 33 at which the first tensile structure is located and the second area of chamber 33 at which the second tensile structure is located may be in fluid communication. For example, chamber 33 may be substantially free of interior bonds between a first part of the first tensile structure near the second tensile structure and a second part of the second tensile structure near the first tensile structure.

Alternatively, chamber 33 may include at least one interior bond between a third part of the first tensile structure near the second tensile structure and a fourth part of the second tensile structure near the first tensile structure. That is, chamber 33 may be substantially free of interior bonds at one area between a first tensile structure and second tensile structure, but chamber 33 may include one or more internal bonds at a second area between the first tensile structure and the second tensile structure.

Similarly, although depicted in FIGS. 4-8D as including four tensile structures 50a-50d, various configurations of chambers 33 incorporated into articles of footwear may include fewer tensile structures, and the locations and relative heights of those tensile structures within chamber 33 may vary as well. In some configurations of footwear, chamber 33 may incorporate a first tensile structure having a first height at a first part near the second tensile structure and a second tensile structure having a second height at a second part near the first tensile structure, the second height being greater than the first height.

In such configurations, the first tensile structure may be at least partially located in a heel region of the footwear, and the second tensile structure may be at least partially located in a midfoot region of the footwear.

Alternatively, in such configurations, the second tensile structure may be located in at least a heel region of the footwear, and the first tensile structure may be located rearward of the second tensile structure. Such configurations may also include a third tensile structure located within the outer barrier having a third height at a third part near the second tensile structure, the third height being less than the second height, and the third tensile structure being located forward of the second tensile structure.

As a further alternative, in such configurations, the first tensile structure may be located in at least a midfoot region of the footwear, and the second tensile structure may be located forward of the first tensile structure. The first tensile structure of such configurations may also include a lateral segment and a medial segment, and the second tensile structure may be at least partially located between the lateral segment and the medial segment.

In other configurations of footwear, chamber 33 may incorporate a first tensile structure having a first height in a first area and a second tensile structure having a second height in a second area, the second height being greater than the first height. In such a configuration, the second tensile structure may be located in at least a heel region of the footwear, and the first tensile structure may be located rearward of the second tensile structure, as part of a heel bevel structure of the footwear.

In some configurations of footwear, chamber 33 may incorporate a first tensile structure having a first height in a first area and a second tensile structure having a second height in a second area, the second height being less than the first height. In such a configuration, the first tensile structure may be located in at least a midfoot region of the footwear, and the second tensile structure may be located forward of the first tensile structure.

In other configurations of footwear, chamber 33 may incorporate a first tensile structure located within the outer barrier in a first area of chamber 33, a second tensile structure located within the outer barrier in a second area of chamber 33, and a third tensile structure located within the outer barrier in a third area of chamber 33. In such configurations, the first area may be in a rear-most region of the chamber and may have a first height, the second area of the chamber may be between the rear-most region of the chamber and a fore-most region of the chamber and may have a second height greater than the first height, and the third area of the chamber may be in a fore-most region of the chamber and may have a third height less than the second height. The second tensile structure in such configurations may also include a lateral segment and a medial segment, and the third tensile structure may be at least partially located between the lateral segment and the medial segment.

In other words, in various configurations, two or more tensile structures having various heights may be incorporated into different areas of a chamber 33. One or more tensile structures may be located in a heel region, or in a midfoot region, or in a forefoot region of chamber 33, and one or more other tensile structures may be located in different areas of chamber 33. Additionally, tensile structures incorporated into chamber 33 may have various shapes. For example, in various configurations, a tensile structure may have lateral or medial segments in which one or more medial or lateral portions of the tensile structure extend further forward, further rearward, or both, relative to more central portions of the tensile structure, i.e., portions of the tensile structure between the medial and lateral portions of the tensile structure.

The various configurations of chamber 33 described above may be incorporated into an article of footwear or any of a variety of other products, such as apparel, athletic equipment, cushions, and other compressible structures. By incorporating a plurality of tensile structures having different heights into different areas of chamber 33, one or more properties of chamber 33 may be altered, such as a flexibility, stiffness, rigidity, tensile response, compressibility, or force attenuation property of chamber 33. Additionally, a taper or contour may be imparted to chamber 33 without use of a tensile structure that is itself tapered or contoured.

Manufacturing Process

Although a variety of manufacturing processes may be utilized to form chamber 33, an example of a suitable thermoforming process will now be discussed. With reference to FIG. 9, a mold 60 that may be utilized in the thermoforming process is depicted as including an upper mold portion 61 and a lower mold portion 62. Mold 60 is utilized to form chamber 33 from a pair of polymer sheets that are molded and bonded to define barrier portions 41 and 42 as well as peripheral edge 43, and the thermoforming process secures tensile structures 50a-50d within barrier 40. More particularly, mold 60 (a) imparts shape to one of the polymer sheets in order to form first barrier portion 41, (b) imparts shape to the other of the polymer sheets in order to form second barrier portion 42, (c) imparts shape to the polymer sheets in order to form peripheral edge 43 and to form peripheral bond 44 to join a periphery of the polymer sheets, (d) locates tensile structures 50a-50d within chamber 33, and (e) bonds tensile structures 50a-50d to each of barrier portions 41 and 42.

In this example manufacturing process, each of tensile structures 50a-50d may be a textile tensile member. In other manufacturing processes, each of tensile structures 50a-50d may include one or more textile tensile members, and may also include one or more elements that are not textile tensile members, such as tether elements.

In preparation for the manufacturing process, various elements forming chamber 33 may be obtained and organized. For example, an upper polymer layer 71 and a lower polymer layer 72, which form barrier 40, may be cut to a desired shape. Tensile structures 50a-50d are in a compressed state at this stage of the manufacturing process, wherein textile layers 51a-51d and 52a-52d lie adjacent to each other and connecting members 53a-53d are in a collapsed state. Upon completion of the manufacturing process, when chamber 33 is pressurized, tensile structures 50a-50d are placed in tension, which spaces textile layers 51a-51d and 52a-52d from each other and induces connecting members 53a-53d to straighten.

In manufacturing chamber 33, one or more of upper polymer layer 71, lower polymer layer 72, and tensile structures 50a-50d are heated to a temperature that facilitates bonding between the components. Depending upon the specific materials utilized for tensile structures 50a-50d and polymer layers 71 and 72, which form barrier 40, suitable temperatures may range from 120 to 200 degrees Celsius (248 to 392 degrees Fahrenheit) or more. Various radiant heaters or other devices may be utilized to heat the components of chamber 33. In some manufacturing processes, mold 60 may be heated such that contact between mold 60 and the components of chamber 33 raises the temperature of the components to a level that facilitates bonding.

Figure 10A:
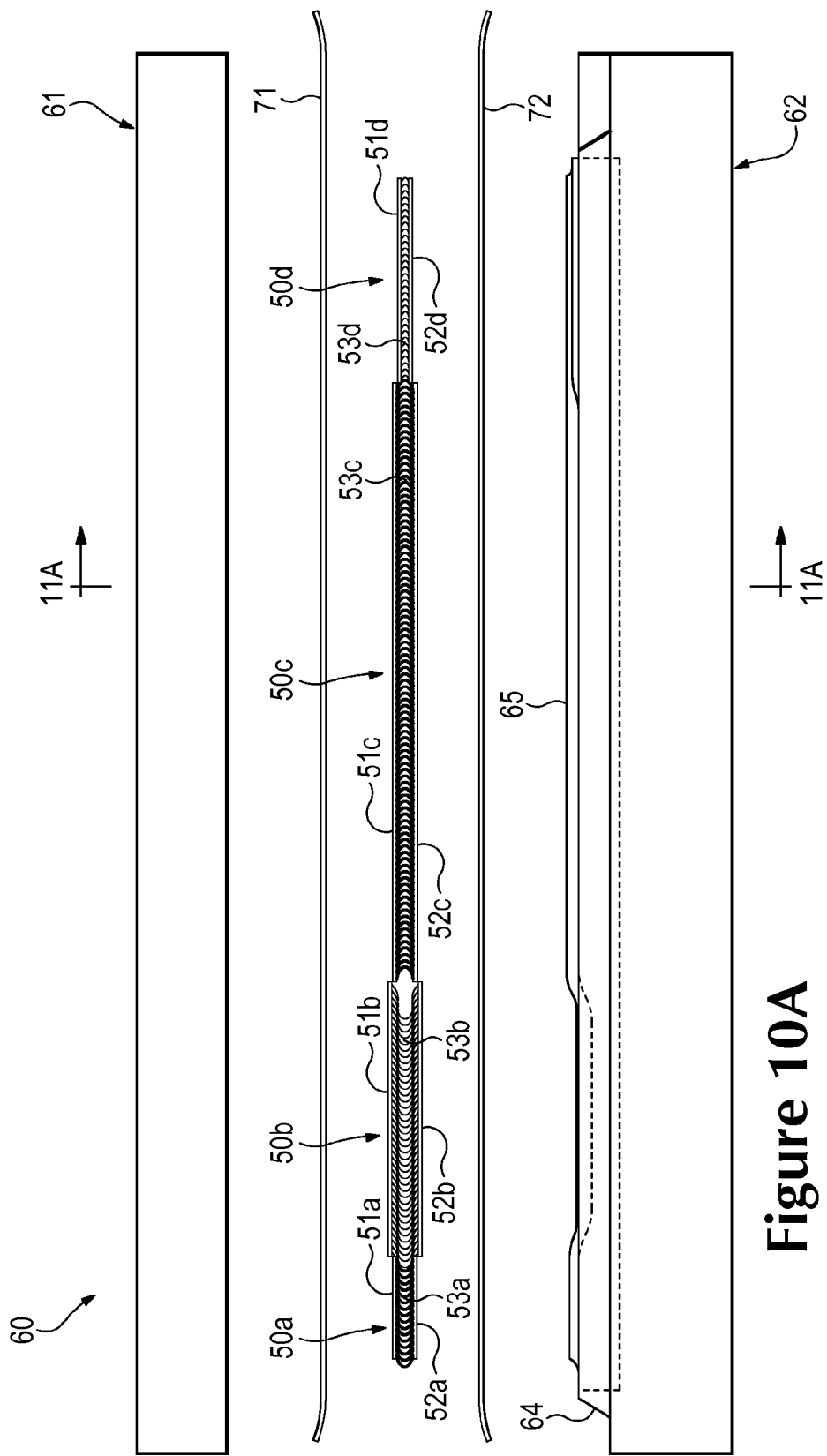
FIGS. 10A-10E are side elevational views of the mold depicting steps in the process for manufacturing the chamber.
Figure 10B:
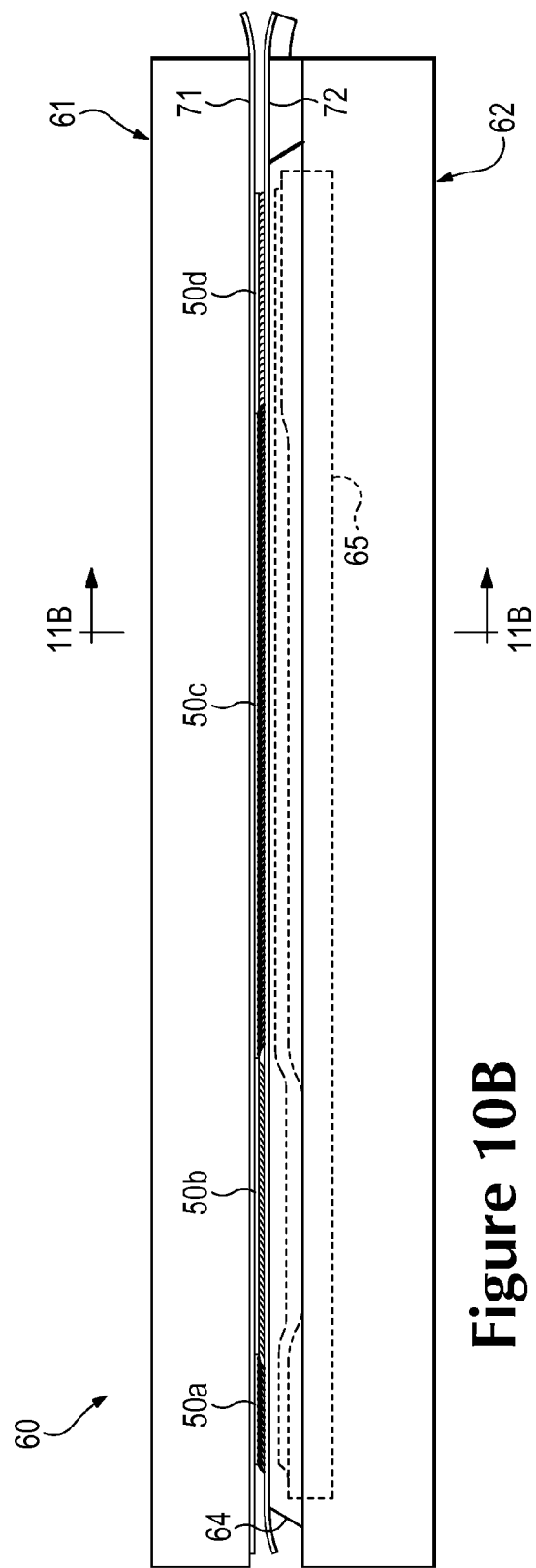
Figure 10C:
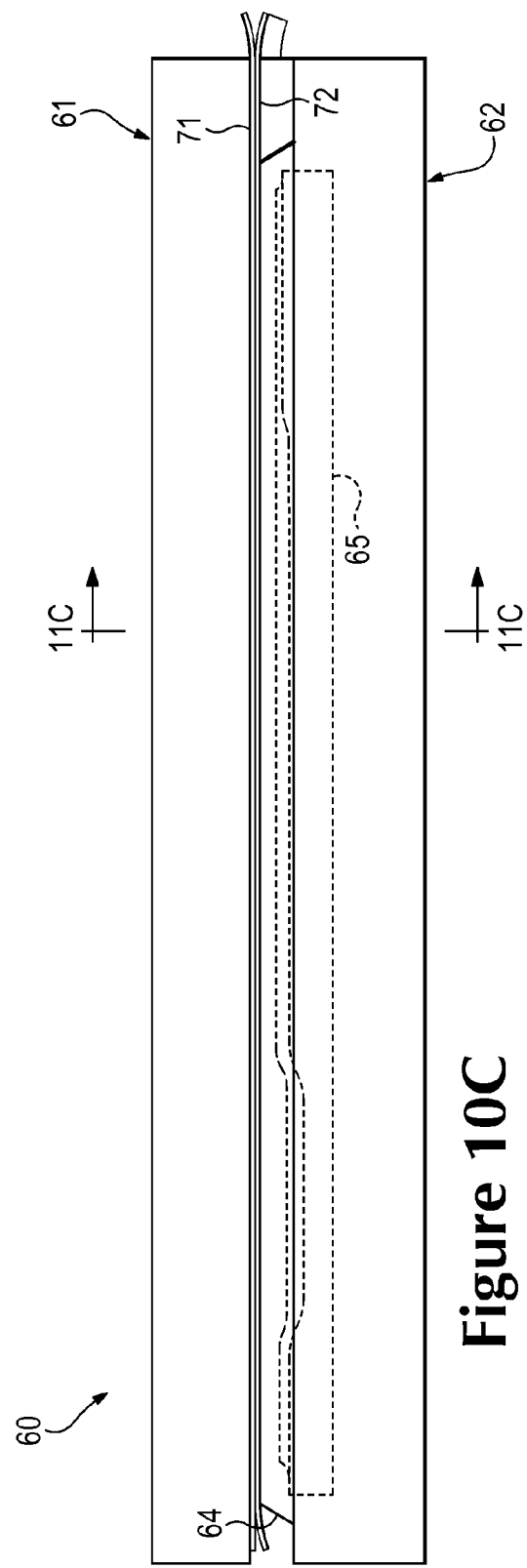
Figure 11A:
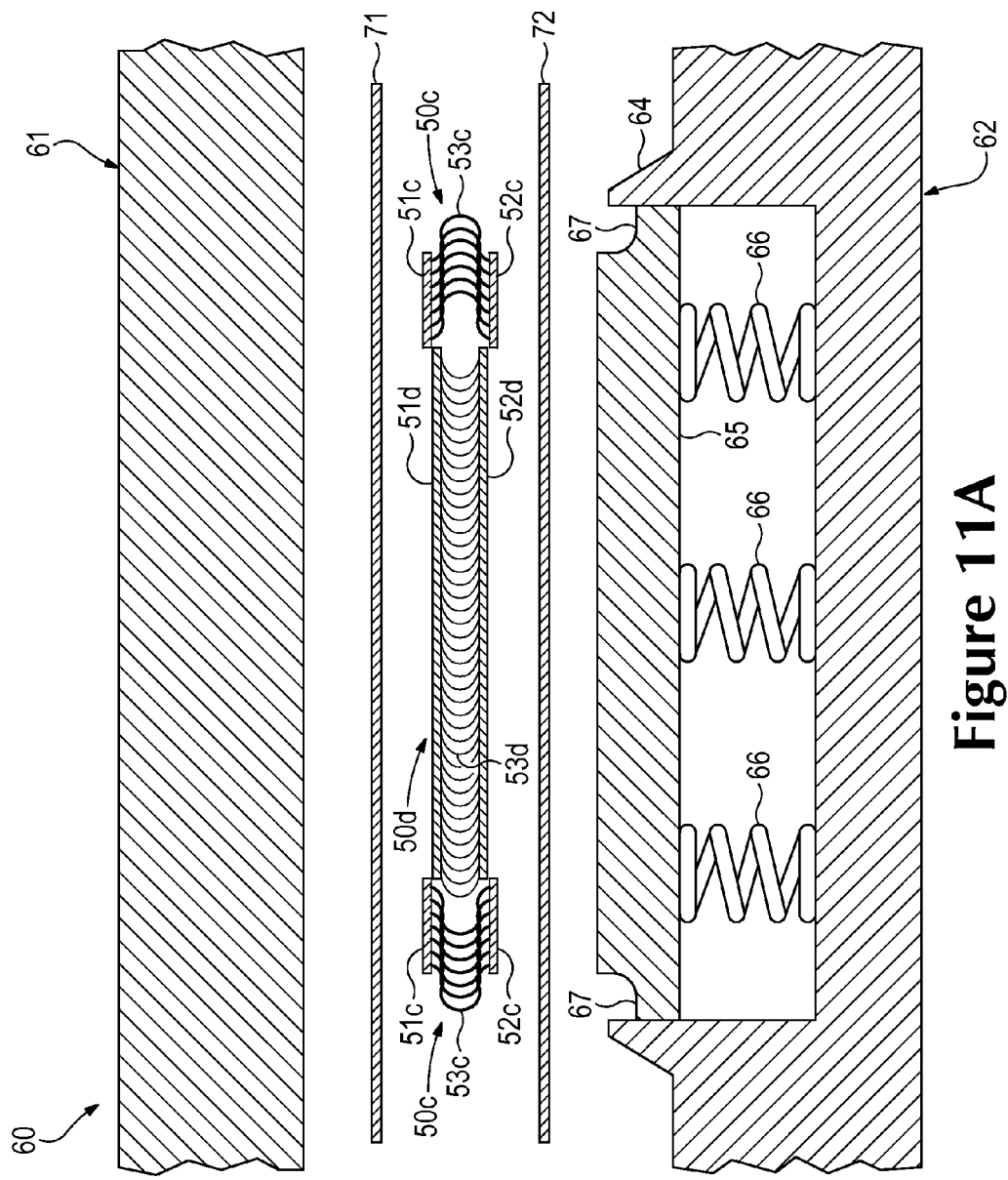
Figure 11B:
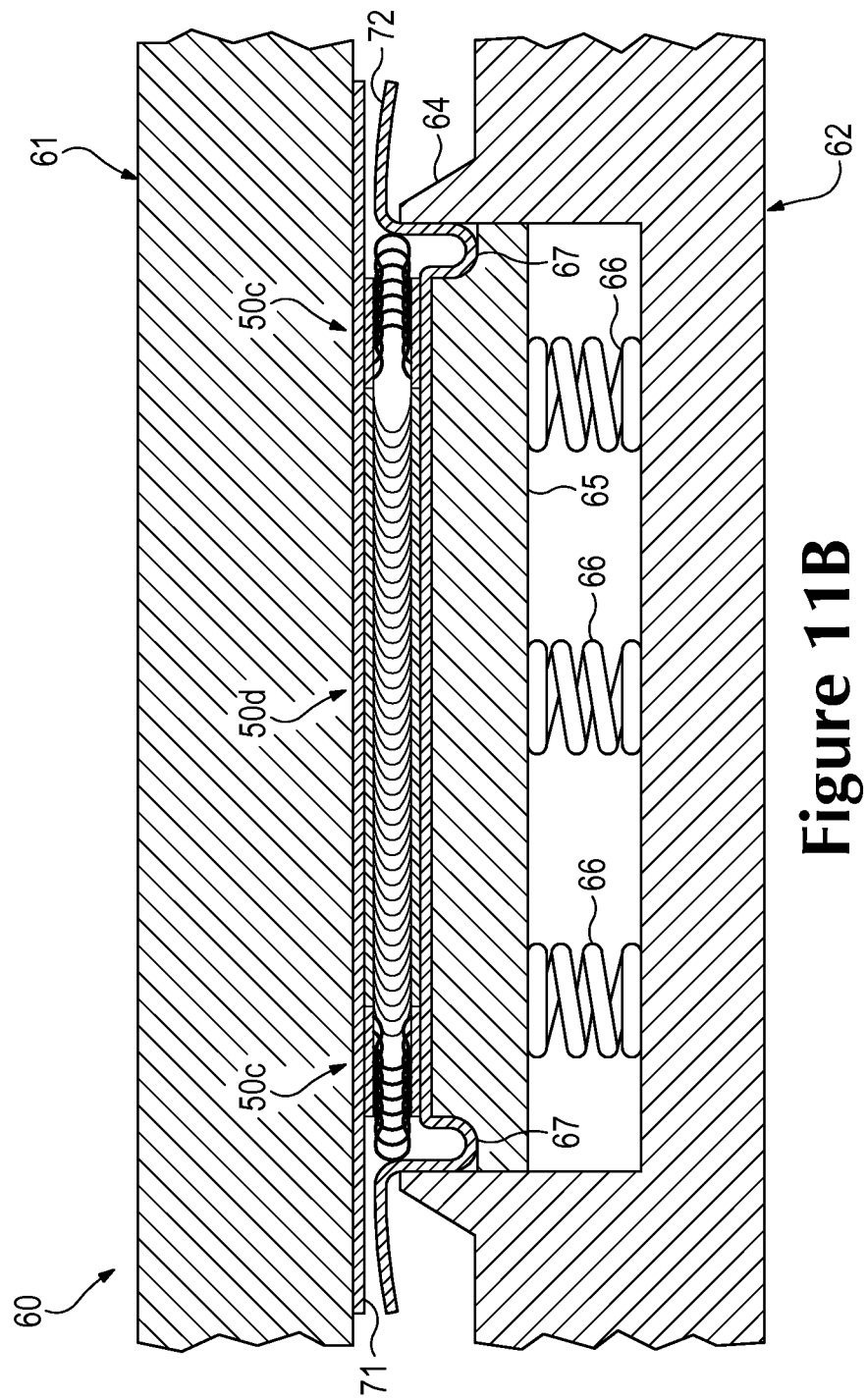

Following heating, the components of chamber 33 are located between mold portions 61 and 62, as depicted in FIGS. 10A and 11A. In order to properly position the components, a shuttle frame or other device may be utilized. Once positioned, mold portions 61 and 62 translate toward each other and begin to close upon the components such that (a) upper mold portion 61 contacts upper polymer layer 71, (b) lower ridge 64 of lower mold portion 62 contacts lower polymer layer 72, and (c) polymer layers 71 and 72 begin bending around tensile structures 50a-50d so as to extend into a cavity within mold 60, as depicted in FIGS. 10B and 11B. The components are thus located relative to mold 60 and initial shaping and positioning has occurred.

At the stage depicted in FIGS. 10B and 11B, air may be partially evacuated from the area around polymer layers 71 and 72 through various vacuum ports in mold portions 61 and 62. The purpose of evacuating the air is to draw polymer layers 71 and 72 into contact with the various contours of mold 60. This ensures that polymer layers 71 and 72 are properly shaped in accordance with the contours of mold 60. Note that polymer layers 71 and 72 may stretch in order to extend around tensile members 50a-50d and into mold 60. In comparison with the thickness of barrier 40 in chamber 33, polymer layers 71 and 72 may exhibit greater original thickness. This difference between the original thicknesses of polymer layers 71 and 72 and the resulting thickness of barrier 40 may occur as a result of the stretching taking place at this stage of the thermoforming process.

A movable insert 65 that is supported by various springs 66 may depress to place a specific degree of pressure upon the components, thereby bonding polymer layers 71 and 72 to opposite surfaces of tensile structures 50a-50d. Movable insert 65 includes a peripheral indentation 67 that forms peripheral edge 43 from lower polymer layer 72. Movable insert 65 may also include one or more height gradients 68. Before the inflation of chamber 33, height gradients 68 may impart a height difference to a surface of chamber 33 in one or more different areas of chamber 33. In turn, after the inflation of chamber 33, such height differences may concentrate at that surface of chamber 33 a change in height between different areas of chamber 33. In some configurations of mold 60, movable insert 65 and springs 66 may be absent, and features such as peripheral indentation 67 and height gradients 68 may instead be incorporated into lower mold portion 62. Furthermore, in some configurations of mold 60, portions of features such as peripheral indentation 67 and height gradients 68 may be incorporated into upper mold portion 61 as well as, or instead of, being incorporated into movable insert 65 or lower mold portion 62.

As mold 60 closes further, upper mold portion 61 and ridge 64 bond upper polymer layer 71 to lower polymer layer 72, as depicted in FIGS. 10O and 11C, thereby forming peripheral bond 44. Furthermore, portions of ridge 64 that extend away from tensile structures 50a-50d form a bond between other areas of polymer layers 71 and 72, contributing to the formation of inflation conduit 73.

In order to provide a second means for drawing polymer layers 71 and 72 into contact with the various contours of mold 60, the area between polymer layers 71 and 72 and proximal to tensile structures 50a-50d may be pressurized. During a preparatory stage of this method, an injection needle may be located between polymer layers 71 and 72, and the injection needle may be located such that ridge 64 envelops the injection needle when mold 60 closes. A gas may then be ejected from the injection needle such that polymer layers 71 and 72 engage ridge 64. Inflation conduit 73 may thereby be formed (see FIG. 10D) between polymer layers 71 and 72. The gas may then pass through inflation conduit 73, thereby entering and pressurizing the area proximal to tensile structures 50a-50d and between polymer layers 71 and 72. In combination with the vacuum, the internal pressure ensures that polymer layers 71 and 72 contact the various surfaces of mold 60.

As discussed above, a supplemental layer of a polymer material or thermoplastic threads may be applied to textile layers 51a-51d and 52a-52d in order to facilitate bonding between tensile structures 50a-50d and barrier 40. The pressure exerted upon the components by movable insert 65 ensures that the supplemental layer or thermoplastic threads form a bond with polymer layers 71 and 72.

Figure 10D:
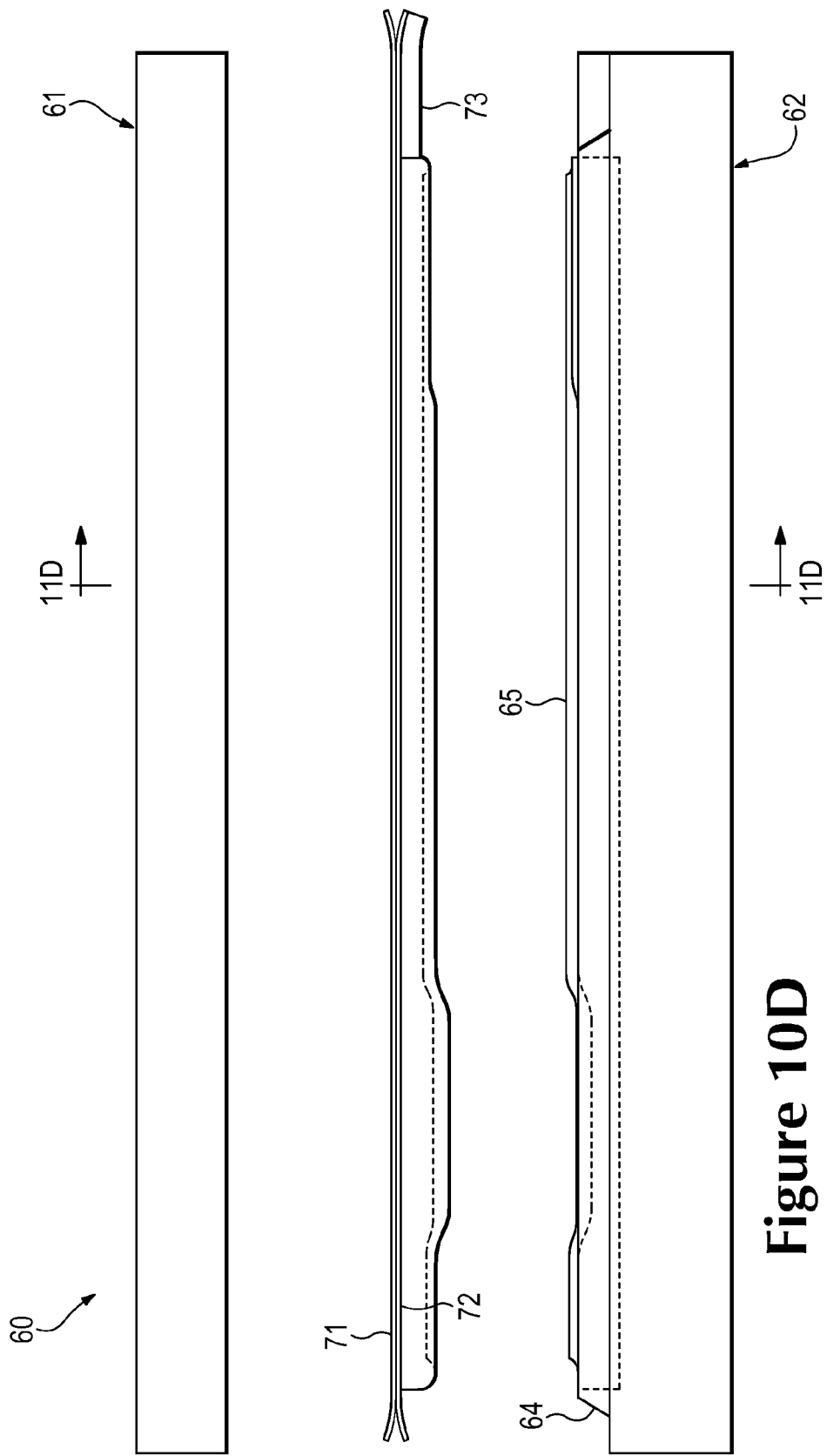
Figure 10E:
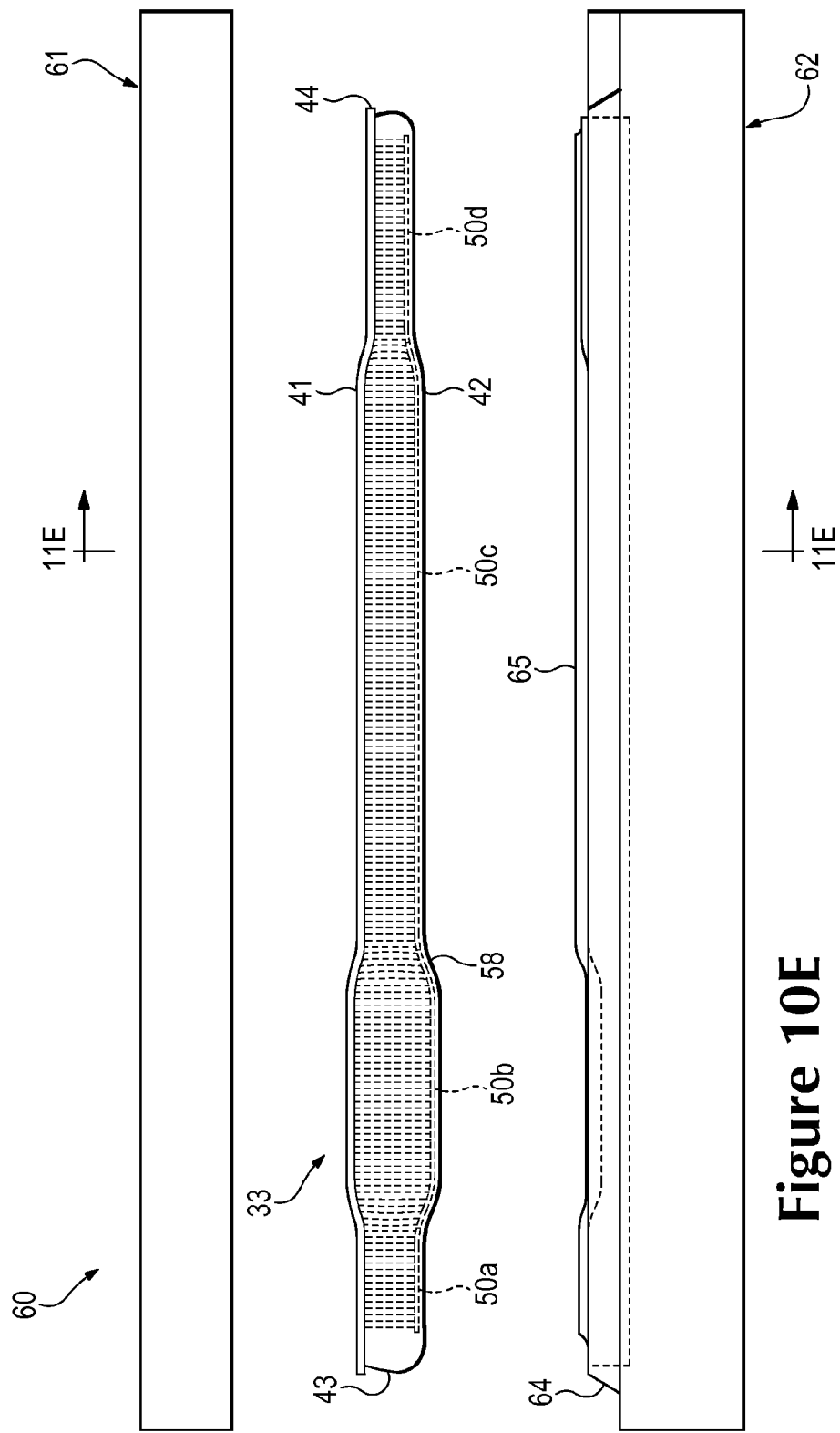
Figure 11D:
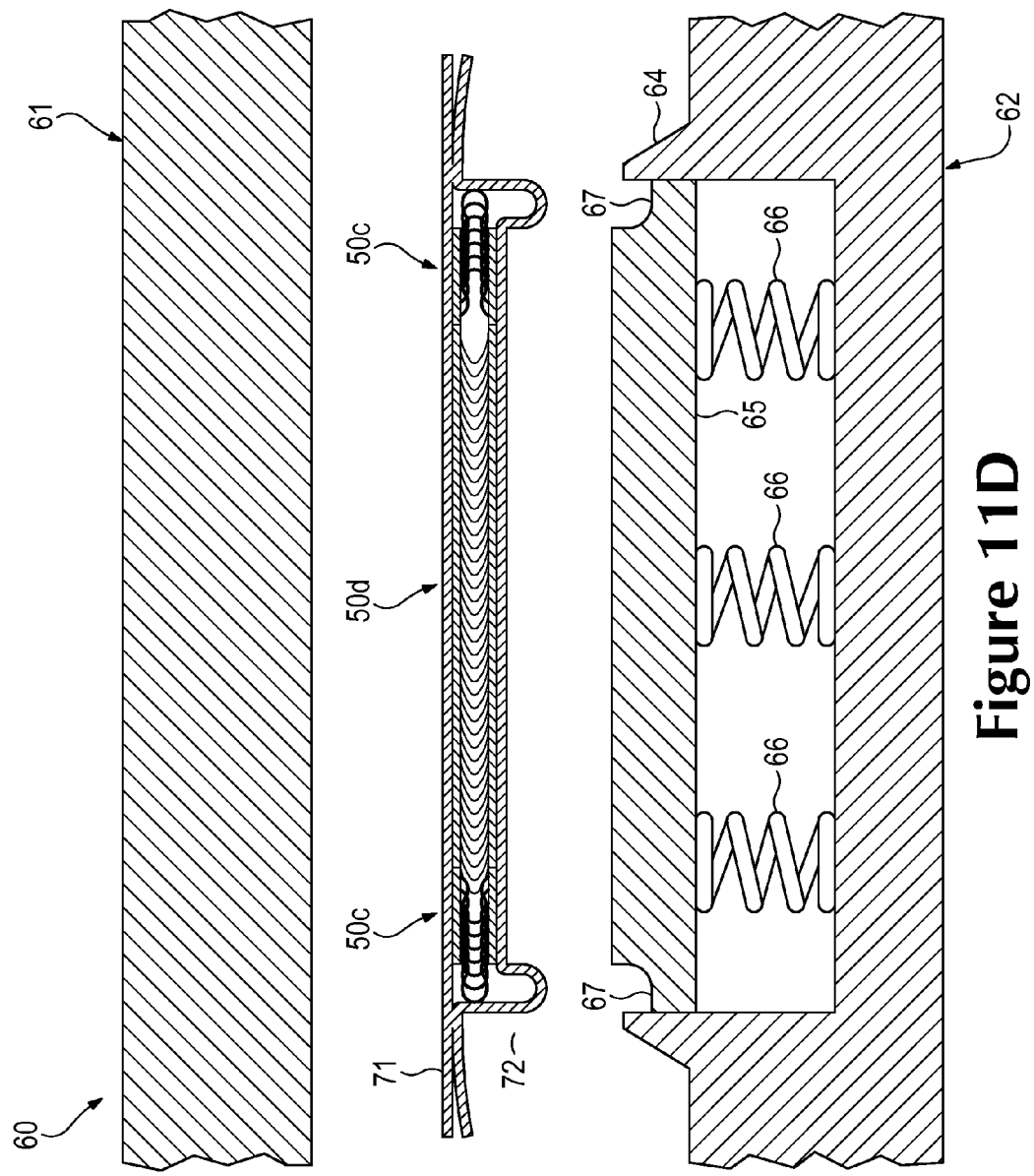
Figure 11E:
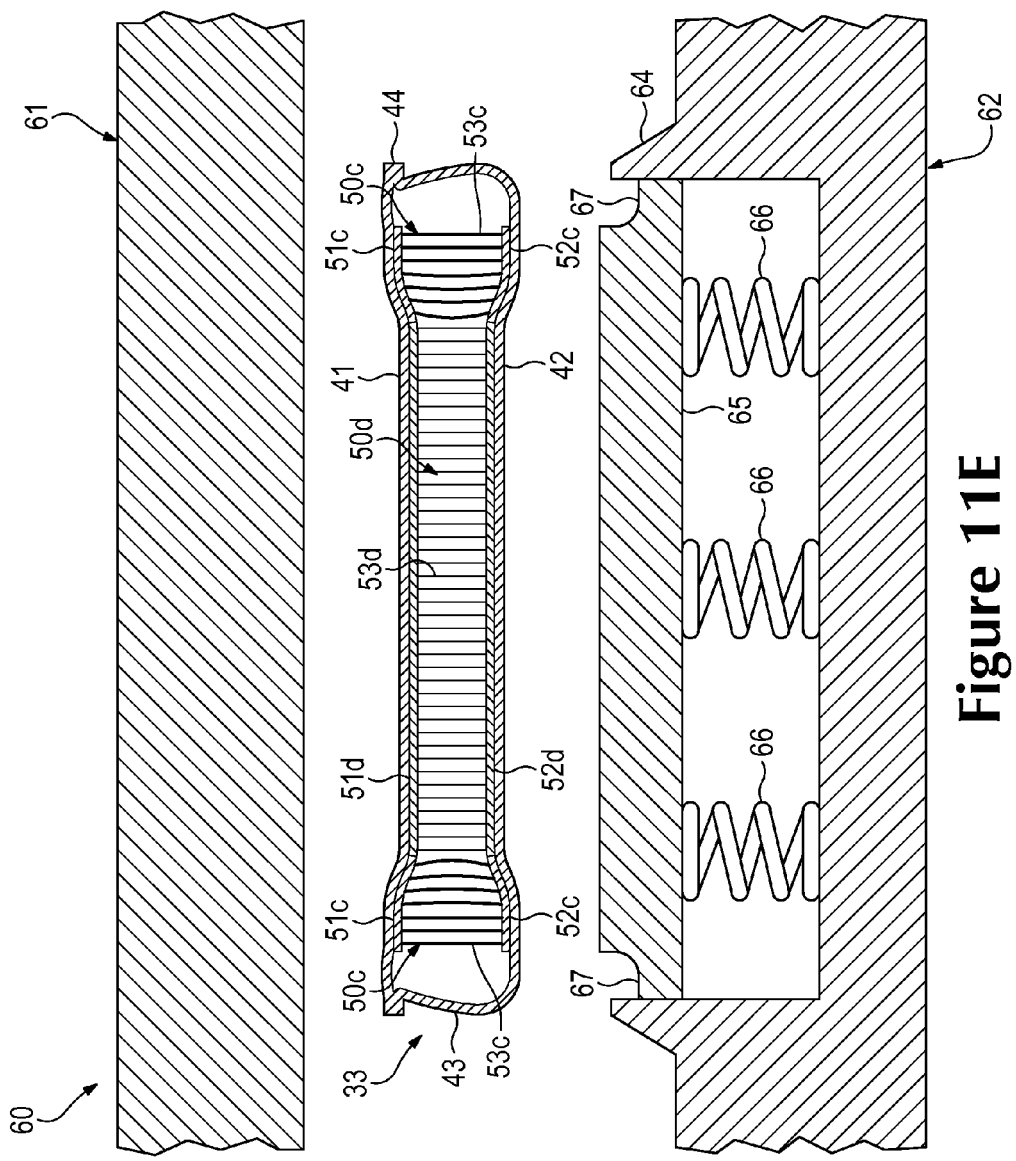

When bonding is complete, mold 60 is opened and chamber 33 and excess portions of polymer layers 71 and 72 are removed and permitted to cool, as depicted in FIGS. 10D and 11D. A fluid may be injected into chamber 33 through the inflation needle and inflation conduit 73. Upon exiting mold 60, tensile structures 50a-50d remain in the compressed configuration. When chamber 33 is pressurized, however, the fluid places an outward force upon barrier 40, which tends to separate barrier portions 41 and 42, thereby placing tensile structures 50a-50d in tension and imparting a contoured configuration to chamber 33. In addition, a sealing process is utilized to seal inflation conduit 73 adjacent to chamber 33 after pressurization. The excess portions of polymer layers 71 and 72 are then removed, thereby completing the manufacture of chamber 33, as depicted in FIGS. 10E and 11E. As an alternative, the order of inflation and removal of excess material may be reversed. As a final step in the process, chamber 33 may be tested and then incorporated into midsole 31 of footwear 10.

Further Configurations

Figure 12A:
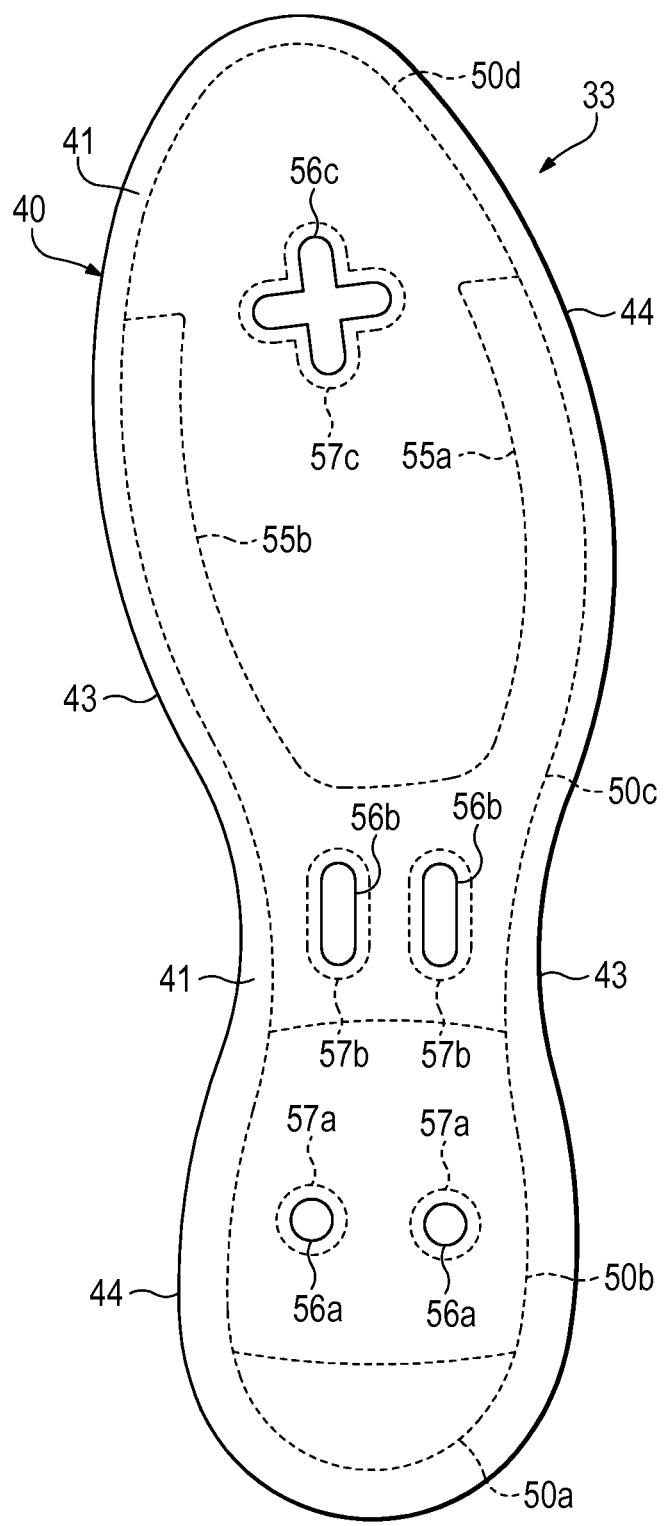

As depicted in FIGS. 4-8D, each of tensile structures 50a-50d extends throughout one of a set of different areas of chamber 33. In other words, portions of tensile structures 50a-50d located inward from their peripheries are not interrupted by interior bonds. However, in other configurations, interior bonds may extend through gaps such as apertures in tensile structures of chamber 33. For example, as depicted in FIG. 12A, Interior bonds 56a-56c extend through gaps 57a-57c in tensile structures 50b-50d to join first barrier layer 41 to second barrier layer 42.

Figure 12B:
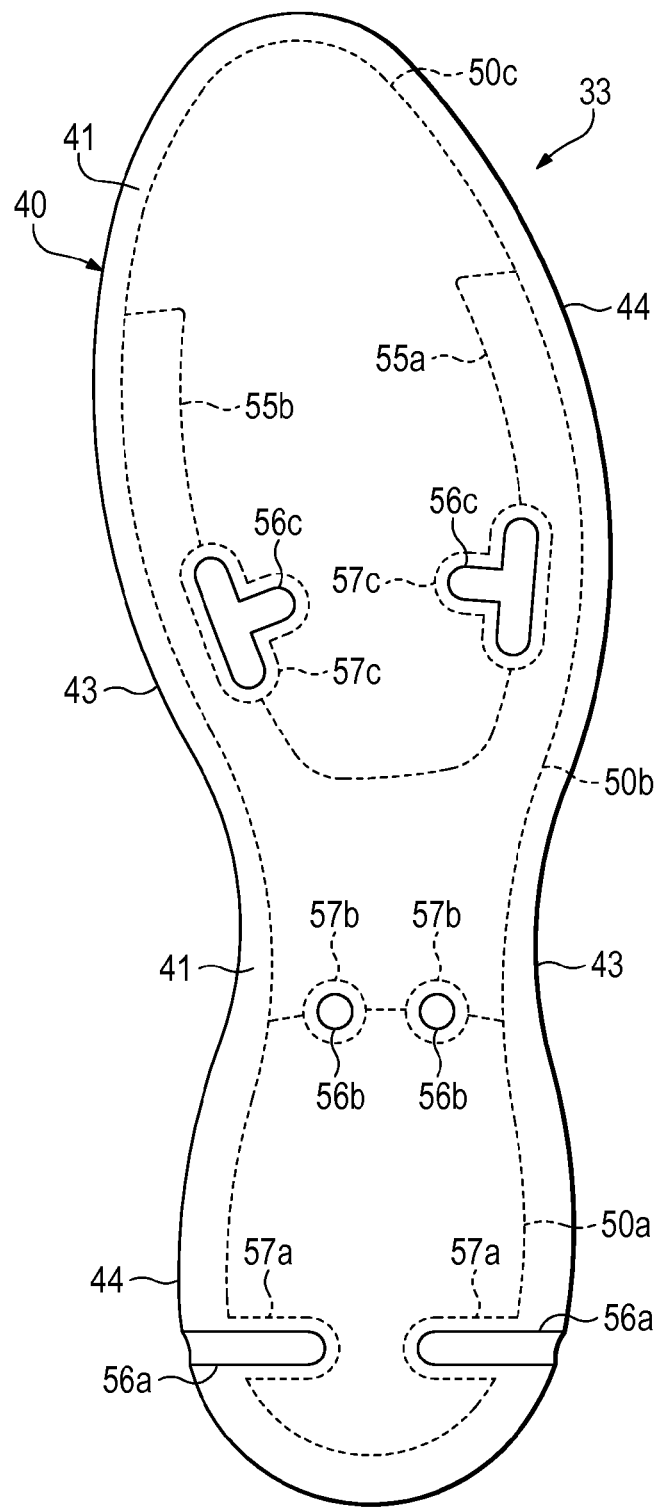

As depicted in FIGS. 4-8D, tensile structures 50a-50d are adjacent to each other, and chamber 33 is substantially free of interior bonds between tensile structures 50a-50d. In other configurations, interior bonds between tensile structures may extend through gaps in the tensile structures, such as apertures or recesses in the tensile structures. For example, as depicted in FIG. 12B, interior bonds 56a extend inward from peripheral bond 44 through gaps 57a in tensile structure 50a to an interior of chamber 33. Tensile structure 50a is formed to have a first height at a first part and a second height at a second part, the second height being greater than the first height, and interior bonds 56a separate the first part from the second part. In addition, interior bonds 56b extend through gaps 57b having convex shapes and cooperatively formed by recesses in tensile structure 50a and tensile structure 50b, and interior bonds 56c extend through gaps 57c having non-convex shapes and cooperatively formed by recesses in tensile structure 50b and tensile structure 50c.

Figure 12C:
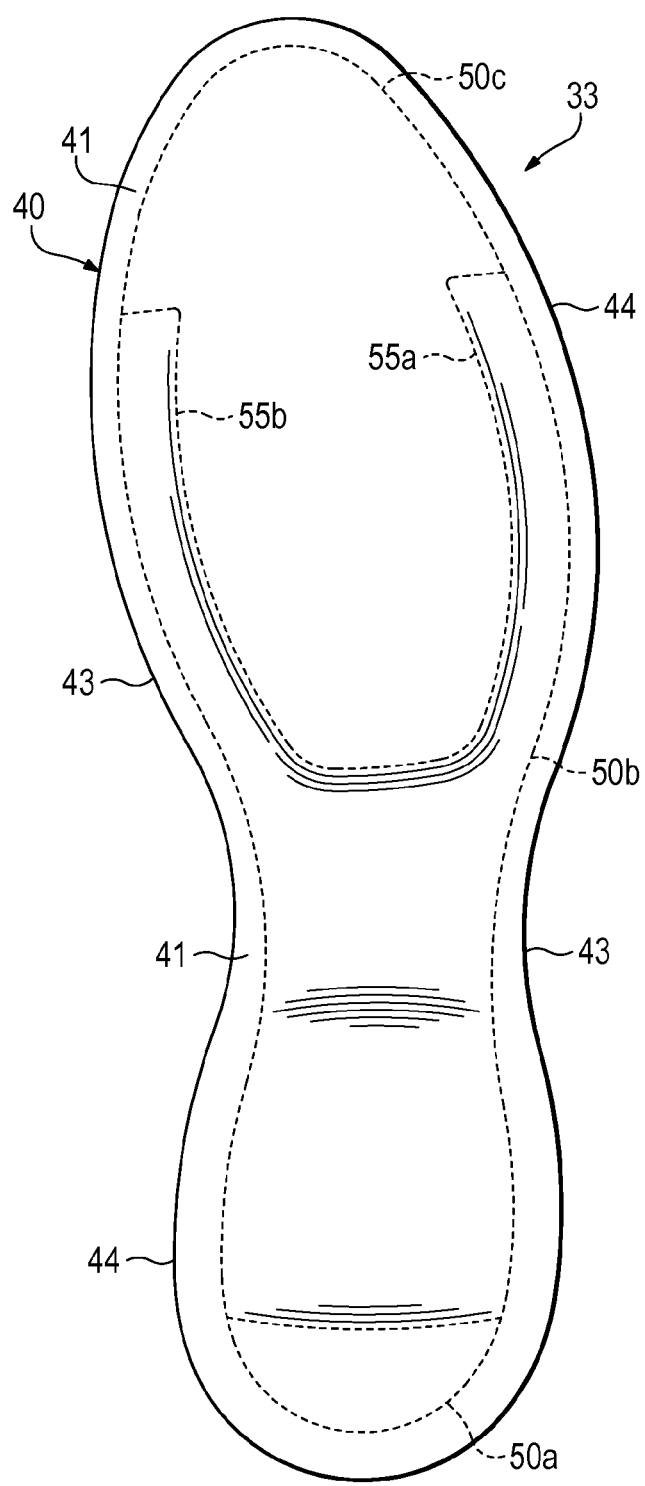
Figure 13A:
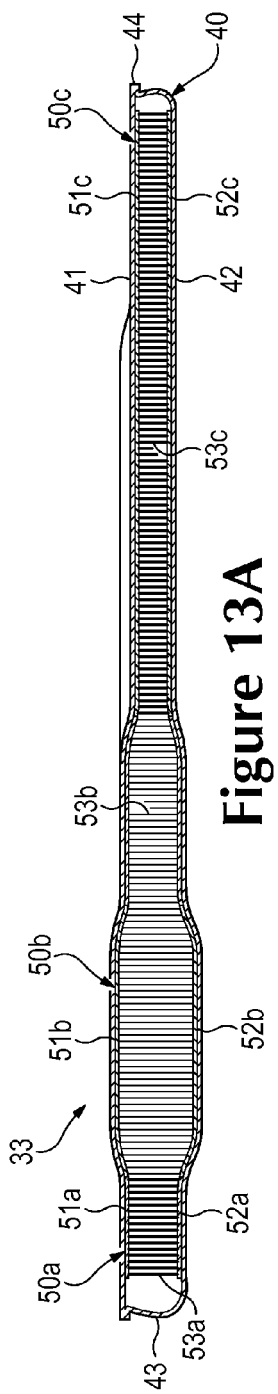
FIGS. 13A-13E are cross-sectional views corresponding with FIG. 8D and depicting additional configurations of the chamber.

As depicted in FIGS. 4-8D, each of tensile structures 50a-50d has a substantially flat configuration and incorporates connecting members 53a-53d of relatively uniform heights. In other configurations, the lengths of any of connecting members 53a-53d may vary, or one or more tensile structures may be contoured, tapered, or otherwise formed to have more than one height. For example, as depicted in FIGS. 12C and 13A, tensile structure 50b is contoured to have a greater height in heel region 13 than in midfoot region 12 and forefoot region 11.

Figure 12D:
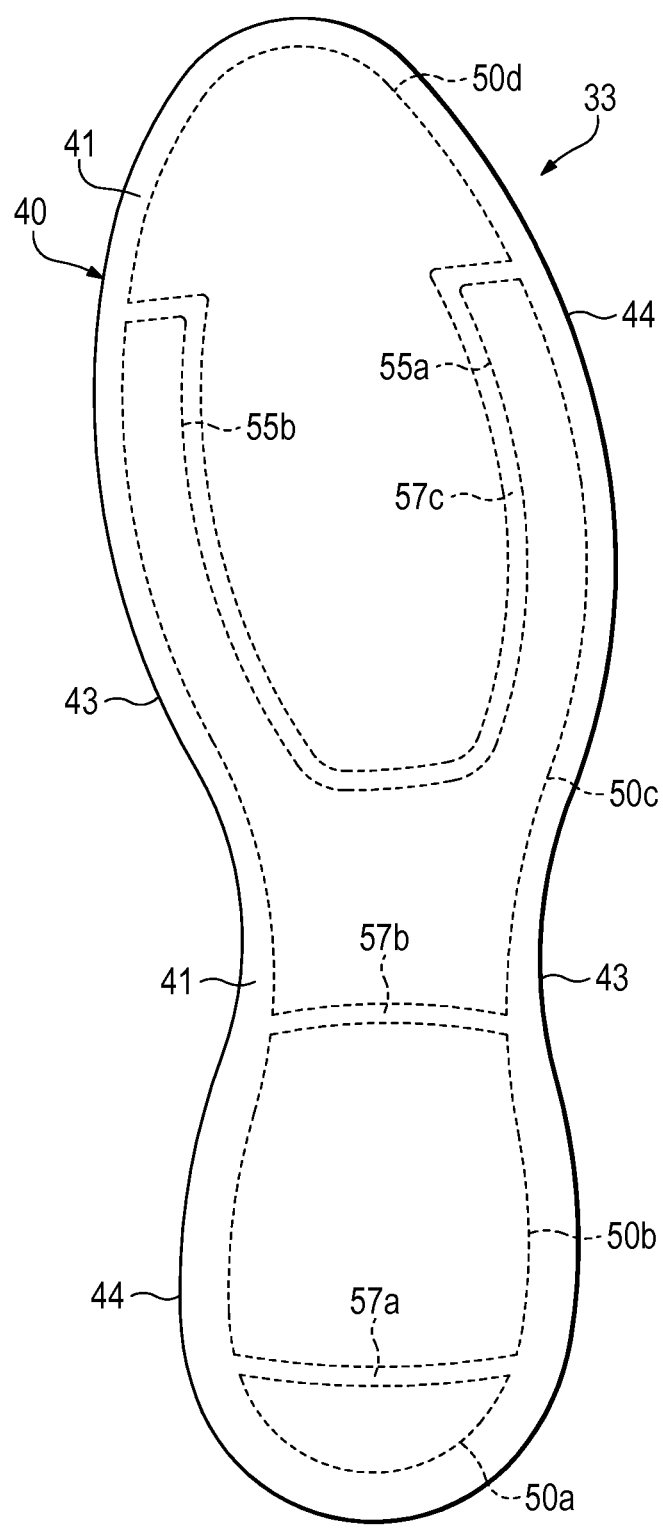
Figure 13B:
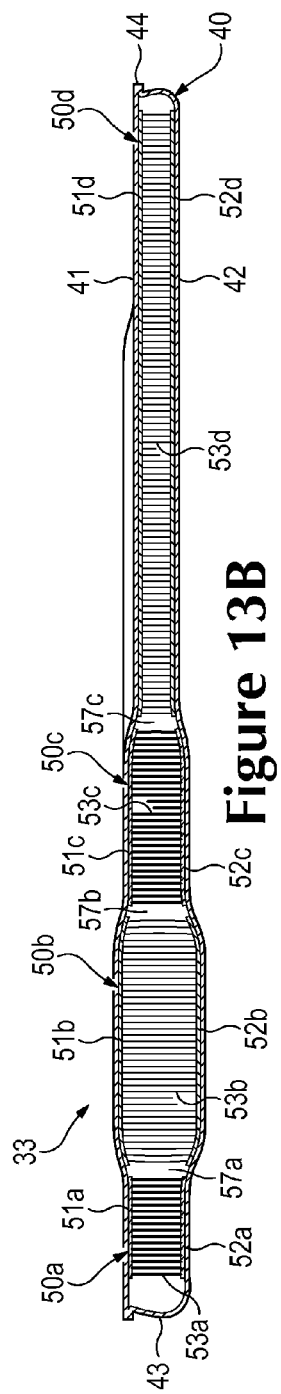

As depicted in FIGS. 4-8D, tensile structures 50a-50d are positioned next to each other such that portions of each tensile structure 50a-50d either directly contacts or is minimally spaced from other tensile structures 50a-50d. In other configurations, a gap or space may at least partially separate tensile structures. For example, as depicted in FIGS. 12D and 13B, gap 57a separates tensile structure 50a from tensile structure 50b, gap 57b separates tensile structure 50b from tensile structure 50c, and gap 57c separates tensile structure 50c from tensile structure 50d.

Figure 12E:
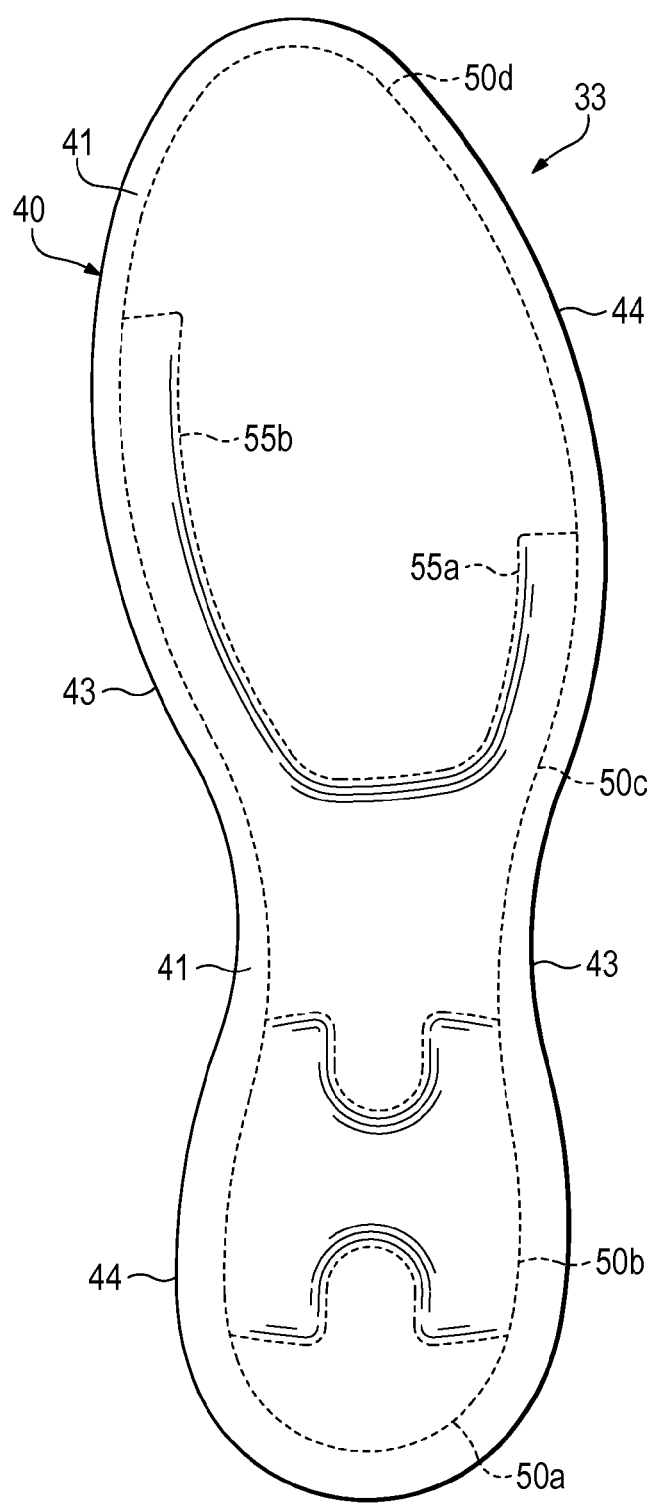

As depicted in FIGS. 4-8D, tensile structure 50c includes lateral segment 55a and medial segment 55b of similar extent. In other configurations, tensile structures located in other areas of chamber 33 may have lateral segments or medial segments, and may have lateral and medial segments of differing extent. For example, as depicted in FIG. 12E, tensile structure 50b has lateral segments and medial segments extending both toward forefoot region 11 of chamber 33 and toward a rear-most region of chamber 33. In addition, lateral segment 55a and medial segment 55b of tensile structure 50c have differing extent.

As depicted in FIGS. 4-8D, chamber 33, as well as tensile structures 50a-50d within chamber 33, extend substantially throughout footwear 10. In other configurations, chamber 33 and tensile structures within chamber 33 may extend through any areas or regions of footwear 10. For example, as depicted in FIG. 12F, chamber 33 and tensile structures 50a and 50b within chamber 33 are configured to extend throughout heel region 13 of footwear 10. In such configurations, tensile structure 50b may be configured to extend throughout additional areas or regions of chamber 33, such as midfoot region 12 and forefoot region 11, up to the full length of chamber 33. Alternatively, as depicted in FIG. 12G, chamber 33 and tensile structures 50c and 50d within chamber 33 are configured to extend throughout midfoot region 12 and forefoot region 11 of footwear 10. In such configurations, tensile structure 12c may be configured to extend throughout additional areas or regions of chamber 33, such as heel region 13, up to the full length of chamber 33. In other configurations, chamber 33 and tensile structures within chamber 33 may extend throughout lateral side 14 of footwear 10, medial side 15 of footwear 10, or any areas or regions of sides 14 and 15 of footwear 10.

Additionally, one or more regions of chamber 33 may be formed or shaped to accommodate additional portions of article of footwear 10. For example, in embodiments in which chamber 33 corresponds with substantially all of footwear 10, a cavity might be formed in midfoot region 12 of chamber 33 to accommodate an electrical or electronic device.

Figure 12H:
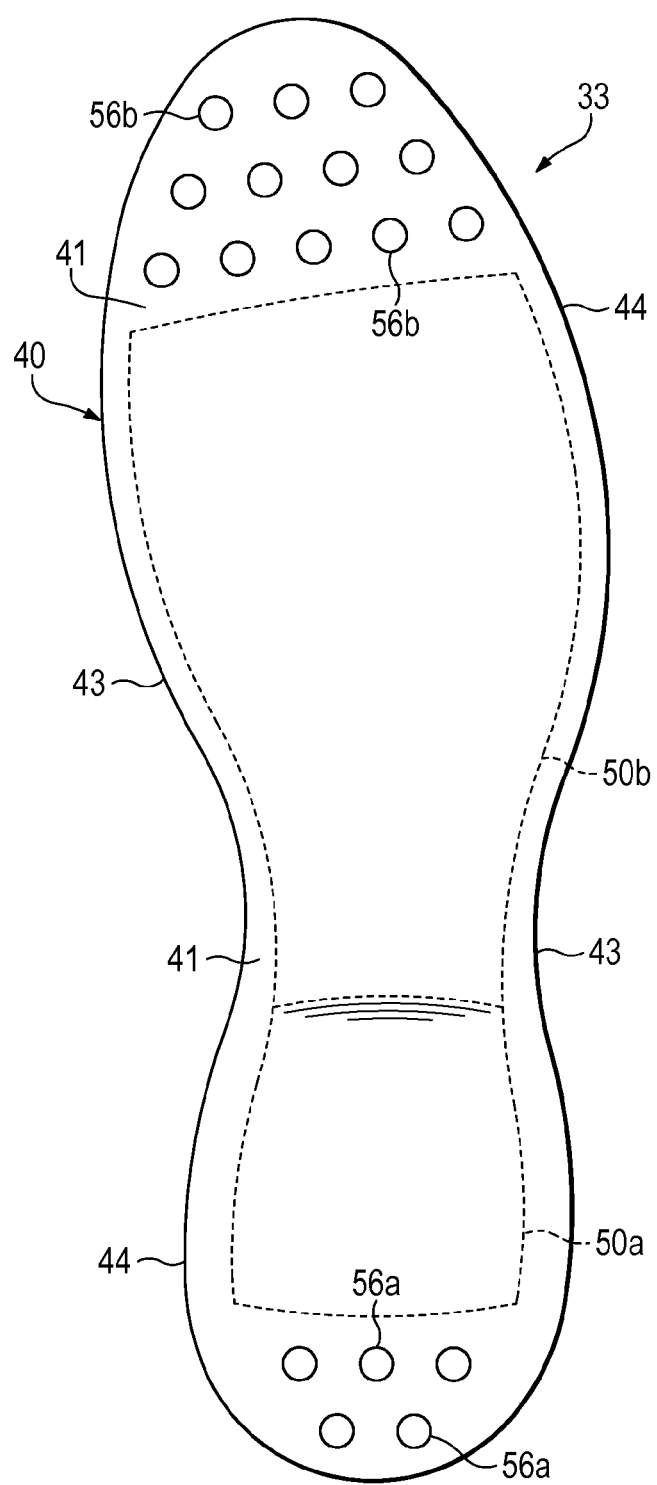

As depicted in FIGS. 4-8D, tensile structures 50a-50d extend in a substantially contiguous manner throughout a central portion of chamber 33, the central portion being spaced inward by a small amount from peripheral edge 43 and extending throughout most of chamber 33. In other words, tensile structures 50a-50d substantially extend throughout most of the interior void within chamber 33. In other configurations, tensile structures may extend throughout less than most of the interior void within chamber 33. For example, as depicted in FIG. 12H, tensile structures 50a and 50b extend throughout portions of heel region 13, midfoot region 12, and forefoot region 11 of chamber 33, and chamber 33 has been formed to include interior bonds 56a and 56b in portions of heel region 13 and forefoot region 11 through which tensile structures 50a and 50b do not extend.

Figure 13C:
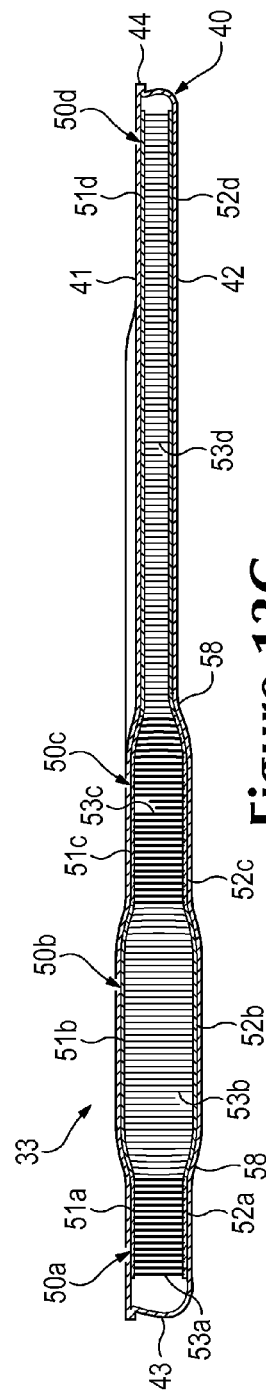

As depicted in FIGS. 4-8D, second barrier portion 42 of chamber 33 is formed to include molded height gradient 58 between an area of chamber 33 incorporating tensile structure 50b and an area of chamber 33 incorporating tensile structure 50c. In other configurations, chamber 33 may be formed to include a molded height gradient between any different areas of chamber 33. For example, as depicted in FIG. 13C, second barrier portion 42 does not include a molded height gradient between areas of chamber 33 incorporating tensile structures 50b and 50c. Instead, second barrier portion 42 includes molded height gradients 58 between areas of chamber 33 incorporating tensile structures 50a and 50b, and between areas of chamber 33 incorporating tensile structures 50c and 50d.

Figure 13D:
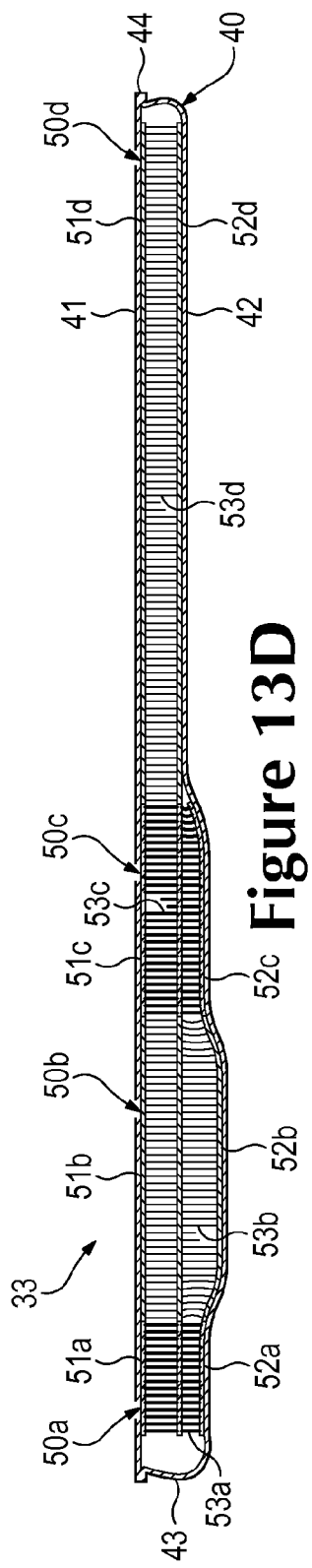

As depicted in FIGS. 4-8D, tensile structures 50a-50d of different heights may be textile tensile members of different heights. In other configurations, tensile structures may be formed of stacked tensile members. Additionally, different stacked tensile structures having different heights and incorporated into different areas of chamber 33 may be formed to incorporate different portions of the same tensile member. For example, as depicted in FIG. 13D, each of tensile structures 50a-50d includes as part of its structure a textile tensile member extending across and through all of the different areas of chamber 33 associated with tensile structures 50a-50d, and each of tensile structures 50a-50c additionally includes as part of its structure another textile tensile member. In some configurations, tensile structures may include textile tensile members stacked and non-textile tensile members. Accordingly, stacked tensile structures may generally take the form of any stacked configuration, such as the stacked configurations disclosed in U.S. patent application Ser. No. 12/938,175, filed 2 Nov. 2010 and entitled "Fluid-Filled Chamber With A Stacked Tensile Member," and may include elements that are not textile tensile members, such as any of the tether element disclosed in U.S. patent application Ser. No. 12/630,642 to Peyton and U.S. patent application Ser. No. 12/777,167 to Peyton.

Figure 13E:
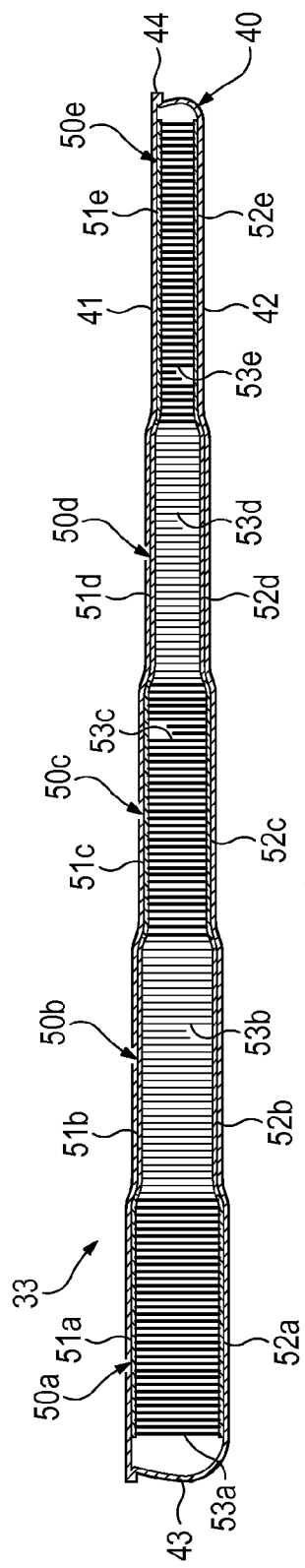
Figure 14:
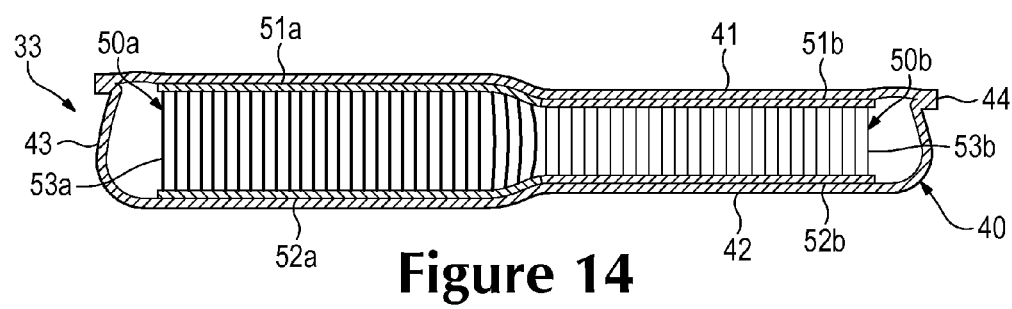
FIG. 14 is a cross-sectional view corresponding with FIG. 8C and depicting an additional configuration of the chamber.
Figure 15:
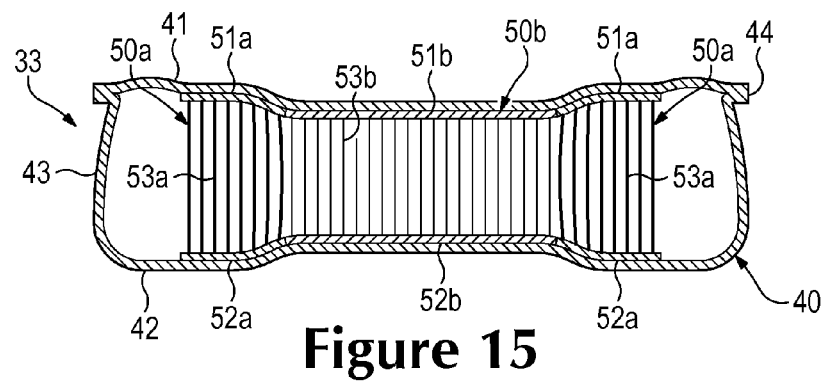
FIG. 15 is a cross-sectional view corresponding with FIG. 8B and depicting an additional configuration of the chamber.

As depicted in FIGS. 4-8D, the relative locations and differences of height of tensile structures 50a-50d impart contours including a heel bevel and a forefoot pocket. In other configurations, the relative locations and differences of height of tensile structures within chamber 33 may impart contours of other features. For example, as depicted in FIG. 13E, the relative locations and differences of height of tensile structures 50a-50e impart a tapered configuration to chamber 33. In another example, as depicted in FIG. 14, the relative locations and differences of height of tensile structures 50a and 50b impart a medio-lateral taper to chamber 33, which may serve as a medially-located arch support. In a further example, as depicted in FIG. 15, the relative locations and differences of height of tensile structures 50a and 50b impart a heel-cup configuration to chamber 33.

Figure 16A:
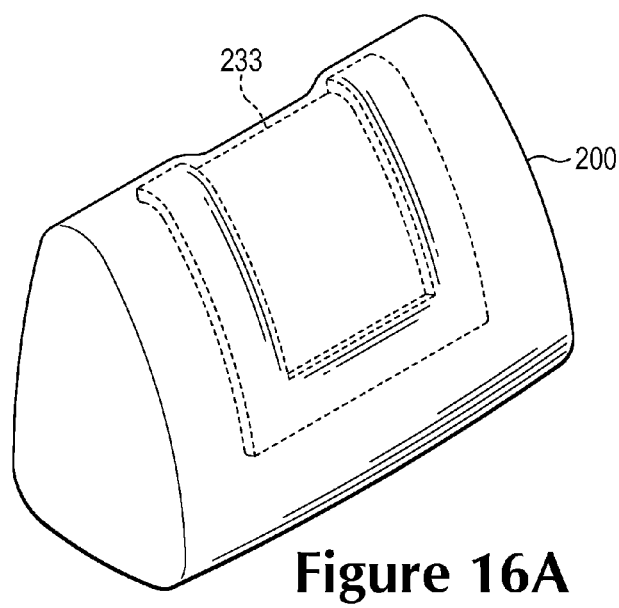
FIGS. 16A-16B are perspective views of other articles incorporating fluid-filled chambers.
Figure 16B:
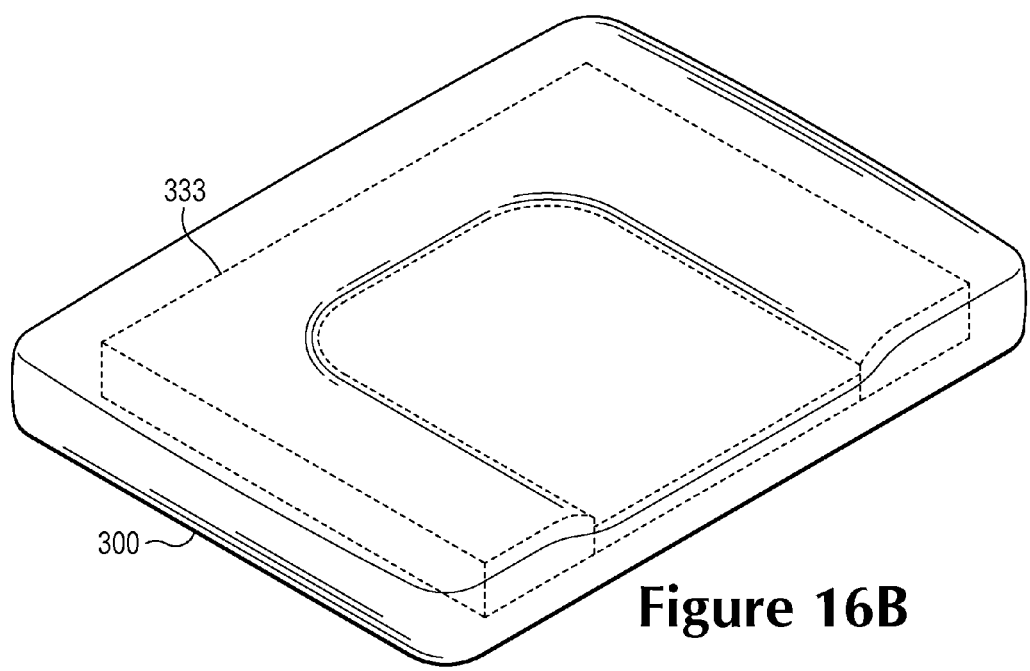

As depicted in FIGS. 4-8C, chamber 33 is suitable for use in footwear. In other configurations, chamber 33 may be suitable for use in other products, such as apparel, athletic equipment, cushions, and other compressible structures. For example, as depicted in FIG. 16B, chamber 233 may be incorporated into a headrest 200. In another example, as depicted in FIG. 16B, chamber 333 may be incorporated into a seat cushion 300.

Figure 17:
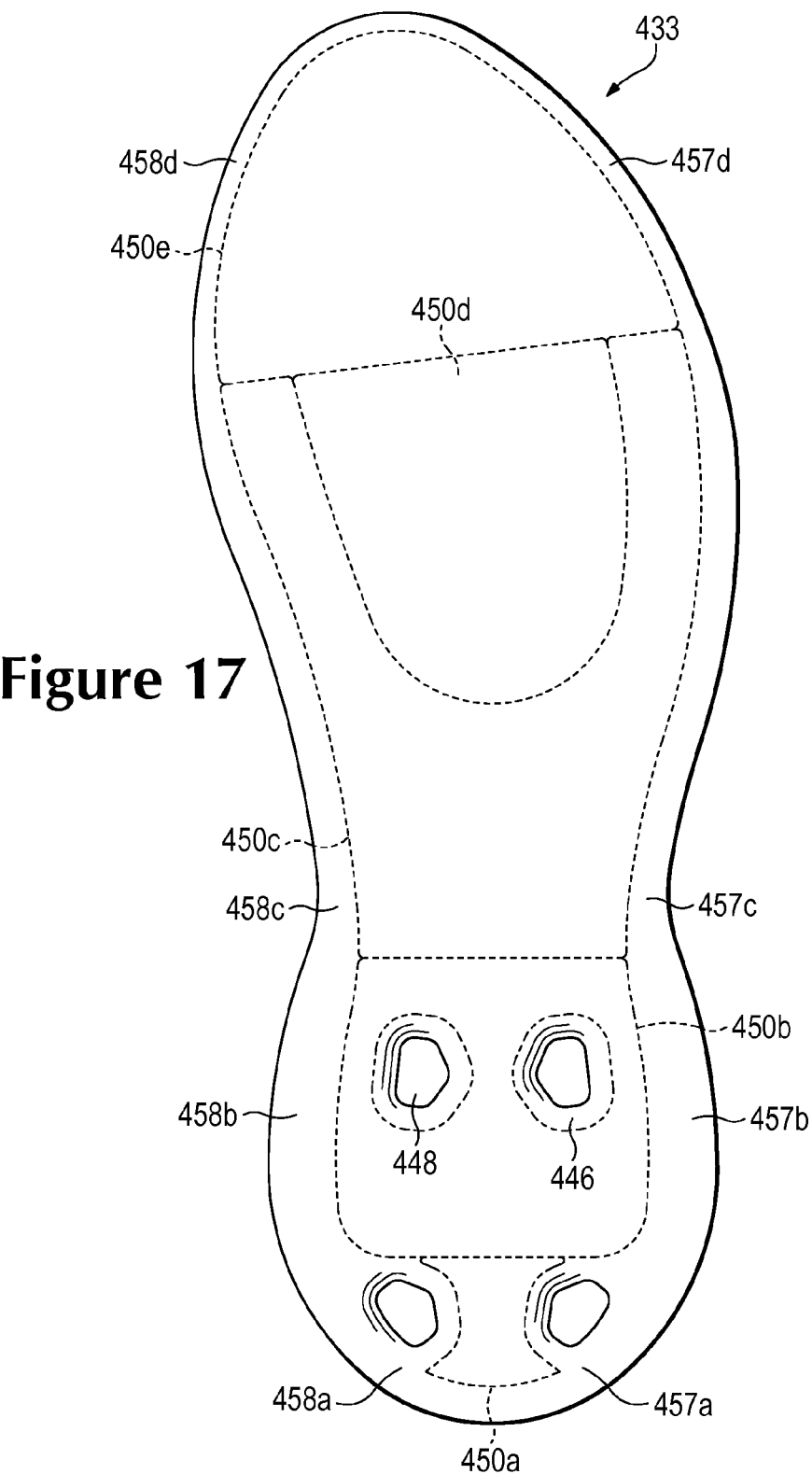
FIG. 17 is a top plan view of an alternate configuration of a fluid-filled chamber.
Figure 18:
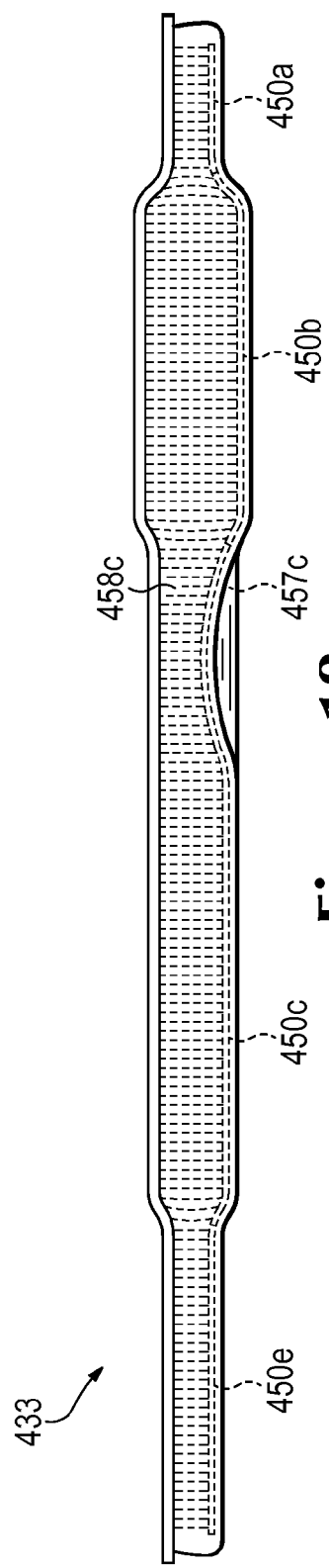
FIG. 18 is a medial side elevational view of the alternate configuration of the chamber.

Tensile structures of different heights may be included in other fluid-filled chambers as well. For example, as depicted in FIGS. 17 and 18, tensile members 450a-450e have been included in fluid-filled chamber 433 along with other elements. Chamber 433 includes indented areas 446 and bonded regions 448. Chamber 433 also includes tensile members 450a-450e, whose heights may differ, which may in turn impart a contour to chamber 433. Additionally, chamber 433 includes a window portion having both first window areas 457a-457d and opposite second window areas 458a-458d, which may have different extents of outward protrusion, including a variation between a lateral side and a medial side of chamber 433.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear incorporating a sole structure, the sole structure comprising:
   a midsole that includes a fluid-filled chamber, the fluid-filled chamber comprising:
      an outer barrier having an upper portion, an opposite lower portion, and a peripheral edge,
      a first tensile structure located within the outer barrier, and
      a second tensile structure located within the outer barrier; and
   an outsole secured to the midsole, the outsole forming at least part of a ground-contacting surface of the footwear;

wherein (a) the first tensile structure has a first height at a first part near the second tensile structure, and the second tensile structure has a second height greater than the first height at a second part near the first tensile structure, and (b) an area of the chamber located between the first part and the second part is substantially free of interior bonds.

2. The article of footwear of claim 1, wherein at least one of the first tensile structure and the second tensile structure includes a textile tensile member.

3. The article of footwear of claim 1, wherein the first tensile structure and the second tensile structure are each part of a single tensile structure, and the first tensile structure at a third part is separated by at least one interior bond from the second tensile structure at a fourth part.

4. The article of footwear of claim 1, wherein the first part is adjacent to the second part.

5. The article of footwear of claim 1, wherein at least one of the first tensile structure and the second tensile structure has a contoured configuration.

6. The article of footwear of claim 1, wherein at least one of the upper portion and the lower portion is formed to include a molded height gradient located at least partially proximal to both the first tensile structure and the second tensile structure.

7. The article of footwear of claim 1, wherein the first structure is at least partially located in a heel region of the footwear, and the second structure is at least partially located in a midfoot region of the footwear.

8. The article of footwear of claim 1, wherein the second structure is located in at least a heel region of the footwear, and the first tensile structure is located rearward of the second tensile structure.

9. The article of footwear of claim 8, wherein the sole structure further comprises a third tensile structure located within the outer barrier, the third tensile structure having a third height at a third part near the second tensile structure, the third height being less than the second height, and the third tensile structure being located forward of the second tensile structure.

10. The article of footwear of claim 1, wherein the first tensile structure is located in at least a midfoot region of the footwear, and the second tensile structure is located forward of the first tensile structure.

11. The article of footwear of claim 10, wherein the first tensile structure includes a lateral segment and a medial segment, and the second tensile structure is at least partially located between the lateral segment and the medial segment.

12. An article of footwear incorporating a sole structure, the sole structure comprising:
a midsole that includes a fluid-filled chamber, the fluid-filled chamber comprising:
an outer barrier having an upper portion, an opposite lower portion, and a peripheral edge,
a first tensile structure located within the outer barrier in a first area of the chamber, the first tensile structure having a first height, and
a second tensile structure located within the outer barrier in a second area of the chamber, the second area being in fluid communication with the first area, and the second tensile structure having a second height greater than the first height; and
an outsole secured to the midsole, the outsole forming at least part of a ground-contacting surface of the footwear; wherein the second tensile structure is located in at least a heel region of the footwear, and the first tensile structure is located rearward of the second tensile structure.

13. The article of footwear of claim 12, wherein at least one of the first tensile structure and the second tensile structure includes a textile tensile member.

14. The article of footwear of claim 12, wherein the first tensile structure is adjacent to the second tensile structure.

15. The article of footwear of claim 12, wherein at least one of the upper portion and the lower portion is formed to include a molded height gradient located at least partially proximal to both the first tensile structure and the second tensile structure.

16. An article of footwear incorporating a sole structure, the sole structure comprising:
a midsole that includes a fluid-filled chamber, the fluid-filled chamber comprising:
an outer barrier having an upper portion, an opposite lower portion, and a peripheral edge,
a first tensile structure located within the outer barrier in a first area of the chamber, the first tensile structure having a first height, and
a second tensile structure located within the outer barrier in a second area of the chamber, the second area being in fluid communication with the first area, and the second tensile structure having a second height less than the first height; and
an outsole secured to the midsole, the outsole forming at least part of a ground-contacting surface of the footwear; wherein the first tensile structure is located in at least a midfoot region of the footwear, and the second tensile structure is located forward of the first tensile structure, and wherein the first tensile structure includes a lateral segment and a medial segment, and the second tensile structure is at least partially located between the lateral segment and the medial segment.

17. The article of footwear of claim 16, wherein at least one of the first tensile structure and the second tensile structure includes a textile tensile member.

18. The article of footwear of claim 16, wherein the first tensile structure is adjacent to the second tensile structure.

19. The article of footwear of claim 16, wherein at least one of the upper portion and the lower portion is formed to include a molded height gradient located at least partially proximal to both the first tensile structure and the second tensile structure.

20. An article of footwear incorporating a sole structure, the sole structure comprising:
a midsole that includes a fluid-filled chamber, the fluid-filled chamber comprising:
an outer barrier having an upper portion, an opposite lower portion, and a peripheral edge,
a first tensile structure located within the outer barrier in a first area of the chamber,
a second tensile structure located within the outer barrier in a second area of the chamber, and
a third tensile structure located within the outer barrier in a third area of the chamber; and
an outsole secured to the midsole, the outsole forming at least part of a ground-contacting surface of the footwear; wherein (a) the first area is in a rear-most region of the chamber and has a first height, (b) the second area of the chamber is between the rear-most region of the chamber and a fore-most region of the chamber and has a second height greater than the first height, and (c) the third area of the chamber is in a fore-most region of the chamber and has a third height less than the second height, and wherein an area of the chamber located between the second area and the third area is substantially free of interior bonds.

21. The article of footwear of claim 20, wherein at least one of the first tensile structure, the second tensile structure, and the third tensile structure includes a textile tensile member.

22. The article of footwear of claim 20, wherein the first tensile structure is adjacent to the second tensile structure.

23. The article of footwear of claim 20, wherein the second tensile structure is adjacent to the third tensile structure.

24. The article of footwear of claim 20, wherein at least one of the upper portion and the lower portion is formed to include molded height gradient located at least partially proximal to both the second tensile structure and the third tensile structure.

25. The article of footwear of claim 20, wherein the second tensile structure includes a lateral segment and a medial segment, and the third tensile structure is at least partially located between the lateral segment and the medial segment.

26. An article of footwear incorporating a sole structure, the sole structure comprising:
a midsole that includes a fluid-filled chamber, the fluid-filled chamber comprising:
an outer barrier having an upper portion, an opposite lower portion, and a peripheral edge,
a first tensile structure located within the outer barrier in a first area of the chamber,
a second tensile structure located within the outer barrier in a second area of the chamber, and
a third tensile structure located within the outer barrier in a third area of the chamber; and
an outsole secured to the midsole, the outsole forming at least part of a ground-contacting surface of the footwear; wherein (a) the first area is in a rear-most region of the chamber and has a first height, (b) the second area of the chamber is between the rear-most region of the chamber and a fore-most region of the chamber and has a second height greater than the first height, and (c) the third area of the chamber is in a fore-most region of the chamber and has a third height less than the second height, and wherein the second tensile structure includes a lateral segment and a medial segment, and the third tensile structure is at least partially located between the lateral segment and the medial segment.

27. The article of footwear of claim 26, wherein at least one of the first tensile structure, the second tensile structure, and the third tensile structure includes a textile tensile member.

28. The article of footwear of claim 26, wherein the first tensile structure is adjacent to the second tensile structure.

29. The article of footwear of claim 26, wherein the second tensile structure is adjacent to the third tensile structure.

30. The article of footwear of claim 26, wherein at least one of the upper portion and the lower portion is formed to include molded height gradient located at least partially proximal to both the second tensile structure and the third tensile structure.

31. The article of footwear of claim 26, wherein an area of the chamber located between the second area and the third area is substantially free of interior bonds.

* * * * *